US011430435B1

(12) United States Patent
Kahan et al.

(10) Patent No.: US 11,430,435 B1
(45) Date of Patent: Aug. 30, 2022

(54) PROMPTS FOR USER FEEDBACK

(71) Applicant: Amazon Technologies, Inc., Seattle, WA (US)

(72) Inventors: Eliav Kahan, Jamaica Plain, MA (US); David Smith, South Jordan, UT (US); Matthew Fuller Sly, Jamaica Plain, MA (US); Joel Toledano, Boston, MA (US); Abhijit Savarkar, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,513

(22) Filed: Dec. 13, 2018

(51) Int. Cl.
*G10L 15/22* (2006.01)
*G10L 15/26* (2006.01)
*G10L 15/18* (2013.01)

(52) U.S. Cl.
CPC .......... *G10L 15/22* (2013.01); *G10L 15/1822* (2013.01); *G10L 15/26* (2013.01); *G10L 2015/225* (2013.01)

(58) Field of Classification Search
CPC ..... G10L 15/18; G10L 15/1822; G10L 15/22; G10L 15/222; G10L 2015/225; G10L 2015/226; G10L 2015/227
USPC .......................... 704/231, 236, 257, 270, 275
See application file for complete search history.

(56) References Cited

U.S. PATENT DOCUMENTS

| | | | |
|---|---|---|---|
| 5,864,805 A | 1/1999 | Chen et al. | |
| 6,088,671 A | 7/2000 | Gould et al. | |
| 6,961,700 B2 | 11/2005 | Mitchell et al. | |
| 7,418,392 B1 | 8/2008 | Mozer et al. | |
| 7,580,838 B2 | 8/2009 | Divay et al. | |
| 7,720,683 B1 | 5/2010 | Vermeulen et al. | |
| 7,774,204 B2 | 8/2010 | Mozer et al. | |
| 7,983,912 B2 | 7/2011 | Hirakawa et al. | |
| 8,041,344 B1 * | 10/2011 | Coughlan | H04L 51/12 455/414.1 |
| 8,447,602 B2 | 5/2013 | Bartosik et al. | |
| 8,712,943 B1 * | 4/2014 | Kim | G06F 16/245 706/45 |

(Continued)

OTHER PUBLICATIONS

The Examiner's attention is hereby drawn to the specification and file history of co-pending U.S. Appl. No. 15/634,780, entitled "Contextual Voice User Interface", filed Jun. 27, 2017, which may contain information relevant to the present application.

(Continued)

*Primary Examiner* — Martin Lerner
(74) *Attorney, Agent, or Firm* — Pierce Atwood LLP

(57) ABSTRACT

Techniques for selectively requesting feedback from users are described. A system may receive a user input and perform an action responsive to the user input. The system may determine whether feedback should be requested from the user. Such determination may be based on various signals such as the user's present emotional state, whether the user input included profanity, whether the user input interrupted an output of the system, etc. When the system determines feedback should be requested, the system may select a feedback prompt pre-established by a domain, skill, or the like. After the system outputs the response to the user input, the system may output the feedback prompt.

15 Claims, 14 Drawing Sheets

(56) References Cited

U.S. PATENT DOCUMENTS

| | | |
|---|---|---|
| 8,930,881 B1 | 1/2015 | Eddins et al. |
| 9,190,054 B1 | 11/2015 | Riley et al. |
| 9,224,387 B1 | 12/2015 | Slifka |
| 9,916,826 B1 | 3/2018 | Slifka et al. |
| 10,102,851 B1* | 10/2018 | Kiss ................... G10L 15/1822 |
| 10,410,628 B2* | 9/2019 | Chan ....................... G10L 15/08 |
| 10,854,191 B1* | 12/2020 | Geramifard ............. G10L 15/16 |
| 2002/0099542 A1 | 7/2002 | Mitchell et al. |
| 2004/0098274 A1* | 5/2004 | Dezonno ............... H04M 3/523 |
| | | 706/21 |
| 2007/0033026 A1 | 2/2007 | Bartosik et al. |
| 2007/0073540 A1 | 3/2007 | Hirakawa |
| 2007/0106494 A1 | 5/2007 | Detlef et al. |
| 2009/0150156 A1 | 6/2009 | Kennewick |
| 2009/0276215 A1 | 11/2009 | Hager et al. |
| 2009/0313016 A1 | 12/2009 | Cevik |
| 2010/0161332 A1 | 6/2010 | Seltzer et al. |
| 2010/0262464 A1* | 10/2010 | Monteforte ............. G06Q 10/00 |
| | | 705/7.29 |
| 2011/0022387 A1 | 1/2011 | Hager et al. |
| 2012/0004910 A1 | 1/2012 | Quidilig et al. |
| 2012/0310643 A1 | 12/2012 | Labsky et al. |
| 2013/0197909 A1 | 8/2013 | Hager et al. |
| 2014/0074945 A1* | 3/2014 | Kanevsky ............... H04L 51/12 |
| | | 709/206 |
| 2014/0180765 A1* | 6/2014 | Messer ............. G06Q 30/0203 |
| | | 705/7.32 |
| 2015/0356579 A1* | 12/2015 | Brondstetter ...... G06Q 30/0282 |
| | | 705/7.32 |
| 2016/0365088 A1 | 12/2016 | Liang |
| 2018/0068657 A1* | 3/2018 | Khan ...................... G10L 15/22 |
| 2018/0144743 A1* | 5/2018 | Aggarwal ............... G10L 15/22 |
| 2018/0217981 A1* | 8/2018 | Rakshit .................... G06F 40/30 |
| 2018/0285345 A1* | 10/2018 | Pradhan .................. G06F 40/30 |
| 2018/0329998 A1* | 11/2018 | Thomson ................ G10L 15/22 |
| 2019/0074004 A1* | 3/2019 | Hashimoto ............. G06F 40/30 |
| 2019/0087404 A1* | 3/2019 | Scheur .................. G06F 40/211 |
| 2019/0197192 A1* | 6/2019 | Jersin .................... G06F 16/635 |
| 2019/0333118 A1* | 10/2019 | Crimmins ........... G10L 15/1815 |
| 2019/0348037 A1* | 11/2019 | Khullar .................. G10L 15/26 |
| 2019/0355351 A1* | 11/2019 | Kim ........................ G10L 15/22 |
| 2020/0184992 A1* | 6/2020 | Newell .................. G10L 15/22 |

OTHER PUBLICATIONS

The Examiner's attention is hereby drawn to the specification and file history of co-pending U.S. Appl. No. 15/918,167, entitled "Targeted Detection of Regions in Speech Processing Data Streams", filed Mar. 12, 2018, which may contain information relevant to the present application.

* cited by examiner

FIG. 7

| Domain / Skill / Functionality | Feedback Prompt Content | Criteria |
|---|---|---|
| Smart Home Domain | Has Smart Home been invoking the proper smart devices? | User profile associated with smart device(s) |
| Skill 1 | Has Skill 1 been performing requested actions? | User profile indicates Skill 1 is enabled |
| Wakeword Functionality | Has your device been waking up too much recently? | User profile associated with speech-controlled device |
| Wakeword Functionality | Has your device not been waking up enough recently? | User profile associated with speech-controlled device |
| Skill 12345 | Has Skill 12345 been providing requested content? | User profile indicates Skill 12345 is enabled |

PROMPTS FOR USER FEEDBACK

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 7 is a conceptual diagram of pre-established feedback prompts according to embodiments of the present disclosure.

DETAILED DESCRIPTION

Figure 1:
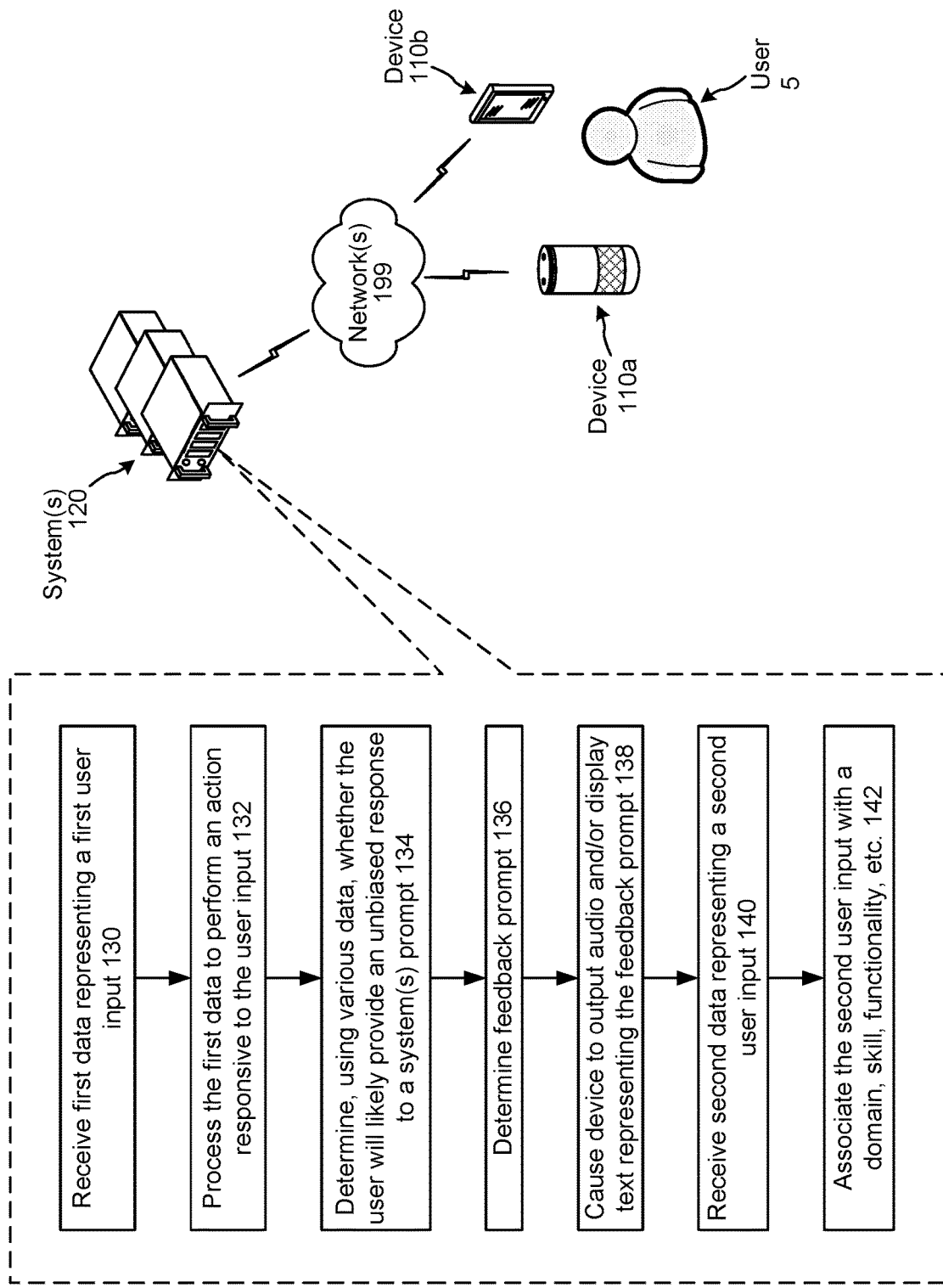
FIG. 1 illustrates a system configured to request feedback from users according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may be configured to perform actions in response to user inputs. For example, for the user input of "Alexa, play Adele music," a system may output music sung by an artist named Adele. For further example, for the user input of "Alexa, turn on the lights," a system may turn on "smart" lights associated with the user's profile.

Such a system may request feedback from a user in order to make improvements to the system. For example, after the system performs an action responsive to a user input, the system may output audio or display text corresponding to "did I get that right," "how was your most recent experience," or the like.

The present disclosure improves such a system by implementing components and techniques that limit when the system requests feedback from users. For example, the system may request feedback from a user only when it is likely that the user will provide accurate, unbiased feedback. As used herein, "unbiased" may refer to feedback that is not premised on an emotional state of the user. For example, feedback may not be valuable if the system can determine that a user is agitated (e.g., tone of voice), in a hurry (based on, e.g., calendar information and current time), in a loud environment, surrounded by multiple individuals, etc.

The system may use various data points to determine when a user may provide accurate, unbiased feedback. Such data points may implicitly represent whether a user may provide accurate, unbiased feedback. Example "implicit signals" include a derived sentiment of a user, a way in which a user has formulated a user input, whether the user has provided a user input that interrupts a system output, a tone of a user's voice, etc. The system may extrapolate, from implicit signals, whether a user may provide accurate, unbiased feedback.

The system may balance a beneficial user experience against an integrity of the feedback requested by the system. For example, the system may implement various parameters to ensure a user is not overwhelmed with requests for feedback, which could in turn lead to the user providing biased feedback (e.g., due to the user being frustrated with receiving too many feedback requests).

The system may control the integrity of the feedback it receives by dynamically configuring the specificity of the feedback the system requests. For example, if the system wants more robust feedback, the system may prompt a user with an open-ended request for feedback (e.g., a request that does not solicit a yes/no response from the user).

The system may receive unsolicited feedback from a user. The system may not, however, use every piece of feedback the system receives because some unsolicited feedback may be biased due to the feedback being premised on the user's present emotional state, for example.

FIG. 1 illustrates a system for requesting feedback from users. Although the figures and discussion illustrate certain operational steps of the system in a particular order, the steps described may be performed in a different order (as well as certain steps removed or added) without departing from the intent of the disclosure. Devices (110a/110b), local to a user 5, may communicate with one or more systems 120 across one or more networks 199.

The device 110a may receive audio corresponding to a spoken user input originating from the user 5. The device 110a may generate audio data corresponding to the audio and may send the audio data to the system(s) 120, which the system(s) 120 receives (130).

Alternatively, the device 110b may receive a text-based input from the user 5. The device 110b may generate text data corresponding to the text and may send the text data to the system(s) 120, which the system(s) receives (130).

The device (110a/110b) may send the audio data and/or text data to the system(s) 120 via a companion application installed on the device (110a/110b). A companion application may enable a device 110 to communicate with the system(s) 120 via the network(s) 199. An example companion application is the Amazon Alexa application that may be installed on a smart phone, tablet, or the like.

The system(s) 120 may process (132) the audio data or text data to perform an action responsive to the user input. If the system(s) 120 receives audio data, the system(s) 120 may perform ASR processing on the audio data to generate text data. The system(s) 120 may perform NLU processing on text data (either as received from the device 110b or as generated from ASR processing). The system(s) 120 may, for example using a skill, perform an action responsive to the user input.

A "skill" may be software running on the system(s) 120 that is akin to a software application running on a traditional computing device. That is, a skill may enable the system(s) 120 to execute specific functionality in order to provide data or produce some other requested output. The functionality described herein as a skill may be referred to using many different terms, such as an action, bot, app, or the like.

The system(s) 120 may request feedback from a user after the system(s) 120 has performed an action in response to a user input. The requested feedback may or may not be associated with the user input (e.g., the requested feedback may or may not correspond to the same domain). A "domain" may refer to a grouping of related functionality provided by the system(s) 120. Example domains include smart home, music, video, flash briefing, and custom (e.g., corresponding to skills that are not associated with any pre-configured domain).

The system(s) 120 may determine (134), using various data, whether the user 5 is likely to provide an unbiased response to a system(s) 120 prompt. In an example, feedback may be in response to a feedback prompt. Part of this determination may include determining whether user-provided feedback would be statistically valuable. In making this determination, the system(s) 120 may consider data relating to the user input and various context data. Data relating to the user input include, for example, a derived sentiment of the user, how the user has formulated the user input, whether the user input interrupted an output of the system, a tone of the user's spoken user input, and substance of the user input. Context data may include, for example, a time of day, a date, a user identifier (which may be used to access various user preferences), and a device identifier (which may be used to access various characteristics of the device 110 that sent to the user input to the system(s) 120).

The system(s) 120 may determine feedback should be requested based on a uniform random sampling. A uniform random sampling may refer to using statistics to determine, based on numerous users of the system, when a good time to request feedback is. For example, the system(s) 120 may determine that users are likely to provide feedback to the system(s) 120 at certain times of day, after user provide inputs corresponds to particular NLU intents, etc. A statistical component of the system(s) 120 may use trends (derived from various users of the system(s) 120) to determine whether feedback should be requested at a present time.

If the system(s) 120 determines the user will likely provide unbiased feedback, the system(s) 120 may determine (136) which feedback prompt to output to the user. A domain may be associated with one or more pre-established feedback prompts. A domain's pre-established feedback prompt(s) may represent feedback that the domain desires the system(s) 120 request from users for purposes of improving the domain's processing. In such an example, the system(s) 120 may select a pre-established feedback prompt for output to the user.

In some instances, the system(s) 120 may not select a pre-established feedback prompt associated with a domain. Rather, the system(s) 120 may generate a feedback prompt that may or may not be associated with any particular domain. In an example, the system(s) 120 may generate a feedback prompt that asks how the user thinks the system(s) 120 is functioning.

The system(s) 120 may cause (138) the device (110a/110b) to output audio and/or display text representing the feedback prompt. The device 110a may receive audio representing a second spoken user input, generate audio data representing the audio, and send the audio data to the system(s) 120, which the system receives (140). The device 110b may receive a second text-based user input, generate text data representing the second text-based user input, and may send the text data to the system(s) 120, which the system(s) 120 receives (140). The received second user input may correspond to feedback responsive to the feedback prompt. The feedback may be provided on scale (e.g., 1 to 5, low to high, like to dislike, etc.). The feedback may additionally or alternatively include comments.

The system(s) 120 may associate (142) the second user input with a domain, skill, functionality, etc. For example, if the system(s) 120 selected a pre-established feedback prompt associated with a domain, the system(s) 120 may associate the second user input with that same domain. For further example, if the system(s) 120 generated a feedback prompt regarding the system(s) 120's processing of a user input, the system(s) 120 may determine a domain, skill, functionality, etc. associated with the user input and may associate the second user input with that domain, skill, functionality, etc.

While the above description of FIG. 1 relates to requesting feedback after the system(s) 120 receives a user input, one skilled in the art will appreciate that steps 134-142 may be performed in other situations. For example, the system(s) 120 may perform some or all of steps 134-142 in response to a false wake up. A false wake up may refer to situations where the device 110 determines the presence of a wakeword (e.g., Alexa) in audio and thereafter sends audio data to the system(s) 120, but the system(s) 120 determines the received audio data does not include a user input to be executed on by the system (e.g., the user input corresponds to speech including the wakeword but that is not directed to the system(s) 120). In this situation, NLU processing may output one or more values that do not satisfy a threshold value. Such values may indicate the speech was not intended for the system(s) 120 and correspondingly that the device 110 falsely waked.

Figure 2:
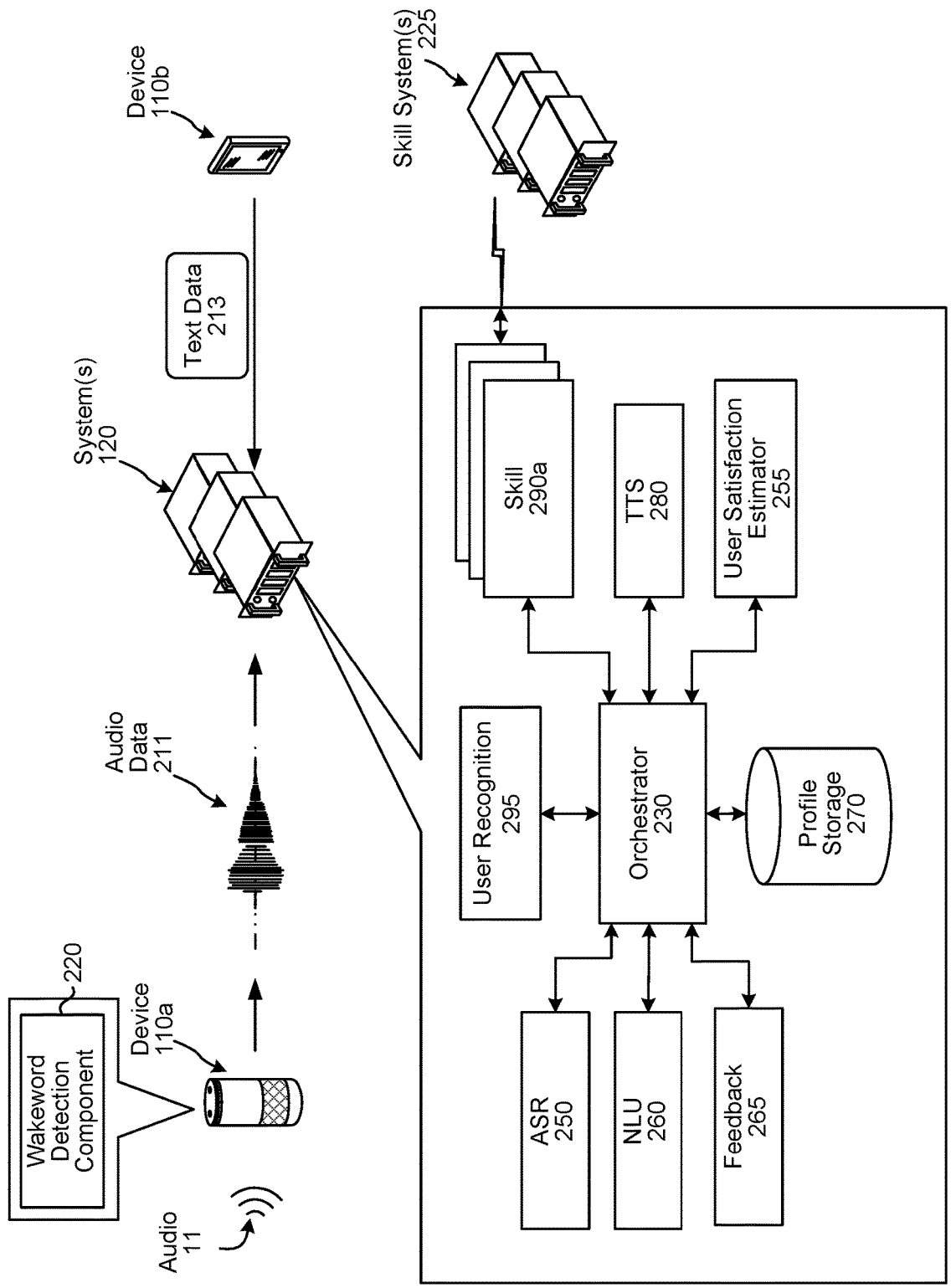
FIG. 2 is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HIVIMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based user input. The device 110b may generate text data 213 representing the text-based user input. The device 110a may send the text data 213 to the system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 225.

Unless expressly stated otherwise, reference to a skill, skill device, skill component, or the like herein may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; information representing enabled skills; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
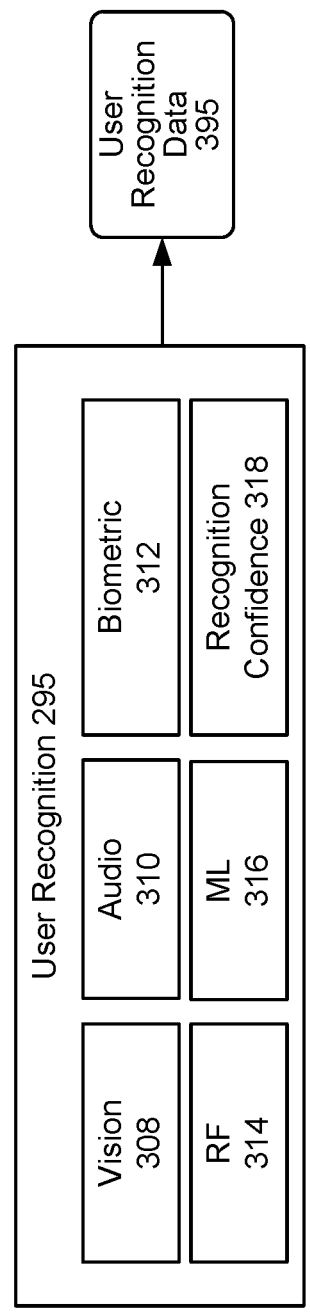
FIG. 3 is a schematic diagram of an illustrative architecture in which sensor data is combined to recognize one or more users according to embodiments of the present disclosure.

The system(s) 120 may include a user recognition component 295 that recognizes one or more users using a variety of data. As illustrated in FIG. 3, the user recognition component 295 may include one or more subcomponents including a vision component 308, an audio component 310, a biometric component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

Figure 4:
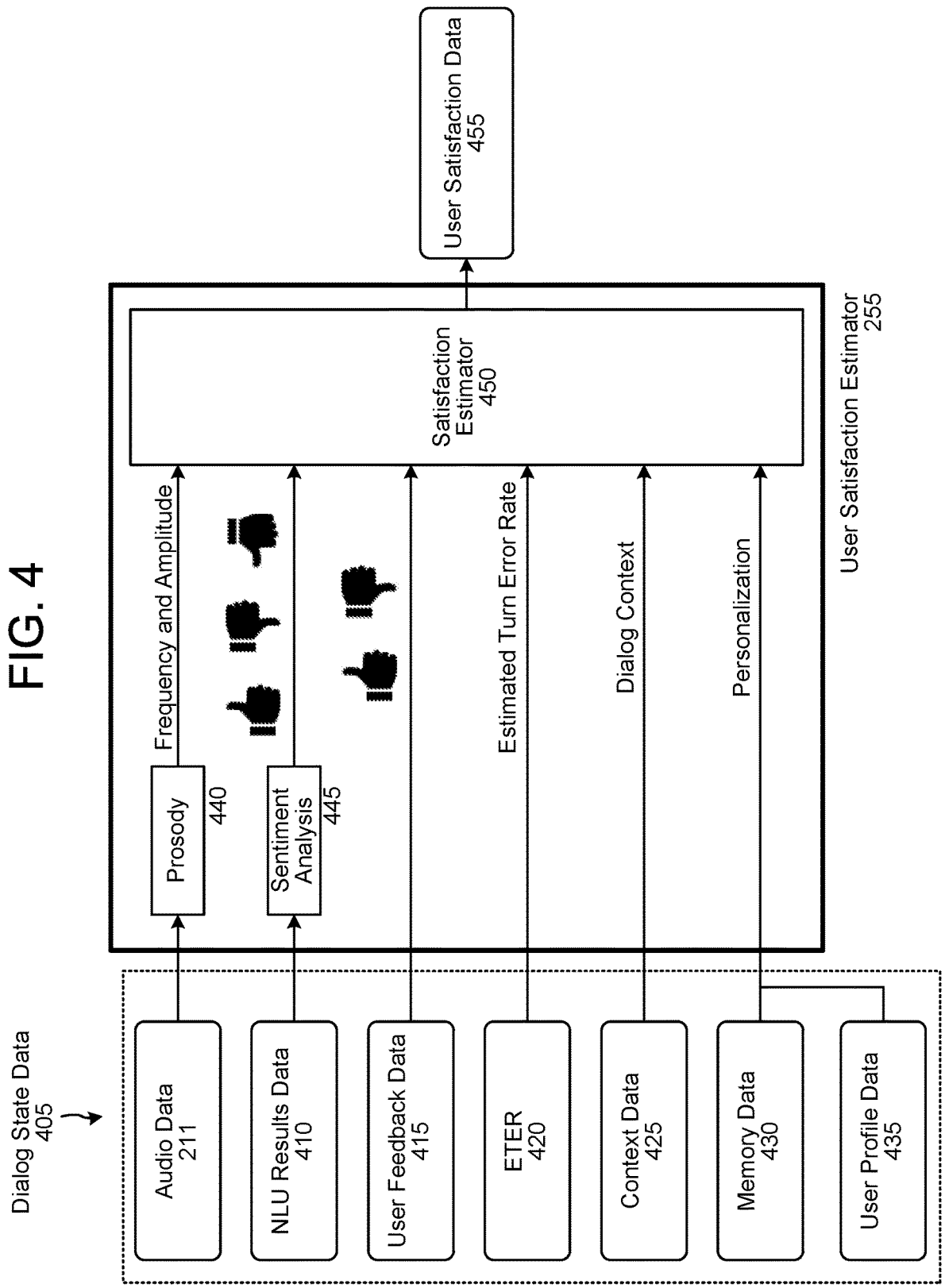
FIG. 4 is a conceptual diagram illustrating example inputs to and outputs from a user satisfaction estimator according to embodiments of the present disclosure.

The system(s) 120 may include a user satisfaction estimator 255 (as illustrated in FIG. 4). The user satisfaction estimator 255 may receive the dialog state data 405 and may generate user satisfaction data 455. The dialog state data 405 may correspond to data associated with a current exchange with the user. The user satisfaction estimator 255 determines an emotive context of the user (e.g., user satisfaction), which may be represented as a scalar value between 1 and 5 (or some other scale) that indicates whether the user is satisfied (e.g., "5") or unsatisfied (e.g., "1") at a particular point in time.

The dialog state data 405, input to the user satisfaction estimator 255, may depend on whether and to what extent a user has explicitly indicated their data may be used for. The dialog state data 405, input to the user satisfaction estimator 255, may be restricted to conform with all applicable laws, regulations, and the like. An implementer of the system(s) 120 herein may choose to implement user privacy standards that are stricter than applicable laws, regulations, and the like. A user may exercise significant control over the user's individual data that is used by various components of the system(s) 120, including but not limited to the user satisfaction estimator 255.

To determine whether the user is pleased or displeased, the user satisfaction estimator 255 may analyze various inputs for evidence of the user's emotional state. For example, the user satisfaction estimator 255 may analyze the audio data 211 to detect variations in the user's speech, such as a change in tone (e.g., when the user is angrily shouting), speech speed, or speech frequency. Similarly, the user satisfaction estimator 255 may analyze (e.g., perform content analysis) the output of the ASR component 250 (e.g., text corresponding to the user's speech) to determine whether the user's speech is positive, negative, or neutral. In an example, the device 110 may include a camera configured to capture image data and the user satisfaction estimator 255 may analyze the image data using facial recognition or the like to identify facial expressions and determine if the facial expressions are positive, negative, or neutral.

The user satisfaction estimator 255 may include three components that include machine learning models: a prosody component 440, a sentiment analysis component 445, and a satisfaction estimator 450. As illustrated in FIG. 4, the audio data 211 and NLU results data 410 may be processed separately by the prosody component 440 and the sentiment analysis component 445, respectively. Outputs of the prosody component 440 and the sentiment analysis component 445 may be input to the satisfaction estimator 450, along with other inputs. While FIG. 4 illustrates the user satisfaction estimator 255 includes three components implementing machine learning models, the present disclosure is not limited thereto. For example, the satisfaction estimator 450 may map a dialog state to a user satisfaction value without intermediate prediction.

The dialog state data 405 may include the audio data 211, the NLU results data 410, user feedback data 415, an Estimated Turn Error Rate (ETER) 420, context data 425, memory data 430, user profile data 435 (associated with the top scoring user identifier output by the user recognition component 295), etc. The user satisfaction estimator 255 may receive the dialog state data 405 from the orchestrator component 230. The orchestrator component 230 may receive portions of the dialog state data 405 from various components and services of the system(s) 120.

The prosody component 440 may analyze the audio data 211 to determine frequency and amplitude of the user's speech, which may indicate whether the user is satisfied or unsatisfied. The prosody component 440 may be configured to identify changes in tone (e.g., happy, sad, etc.) and determine whether the changes in tone correspond to a user satisfaction. For example, the prosody component 440 may detect fluctuations in speech indicating that the user is annoyed or frustrated, which corresponds to a decreased user satisfaction. Additionally or alternatively, the sentiment analysis component 445 may be configured to analyze the NLU results data 410 and identify a sentiment (e.g., positive, neutral, negative) associated with the user input. For example, if the user cancels an action or inputs the same command repeatedly, the sentiment analysis component 445 may determine that the user is unsatisfied and that the system(s) 120 is not performing the desired action. Similarly, if the user input corresponds to a negative comment (e.g., "This machine is so dumb!"), the sentiment analysis component 445 may interpret the user input as an indication that the user satisfaction is low.

The user feedback data 415 may correspond to explicit user feedback indicating whether the user is satisfied or unsatisfied, such as a verbal indication of positive or negative feedback.

The system(s) 120 may estimate if the ASR component 250 and/or NLU component 260 made a mistake, which is indicated by an estimated turn error rate (ETER) 420.

In some examples, the user satisfaction estimator 255 may receive image data and may perform computer vision processing to determine information about a user satisfaction based on facial expressions or the like. For example, the user satisfaction estimator 255 may identify common facial expressions and associate the facial expressions with a user satisfaction value, such as a smile corresponding to a high user satisfaction value and a frown corresponding to a low user satisfaction value.

The context data 425 may be non-user specific, such as temporal information (e.g., time of day). The context data 425 may additionally or alternatively be user specific (e.g., may represent a geographic location of the user).

The memory data 430 may indicate stored preferences or annotations associated with the user, the device 110, and/or the system 100. For example, the user may provide a user input corresponding to "Alexa, remember that I hate mushrooms," "Alexa, my passcode is 12345," "Alexa, I will not go to this restaurant anymore," or the like, and the system(s) 120 may store this information to improve future processing. In some examples, the memory data 430 may correspond to personal graph data.

In some examples, personal graph data includes information specific to a current dialog state. For example, if the user input indicates the user would like to request a ride, corresponding personal graph data may indicate a first number of times that the user has used a first skill and a second number of times that the user has used a second skill. This information is specific to the user but also relevant to the current dialog state.

A "dialog" as used herein may refer to data transmissions (such as relating to multiple user inputs and system(s) 120 outputs) between the system(s) 120 and a local device (e.g., the device 110) that all relate to a single originating user input. Thus, the data transmissions of a dialog may share a dialog identifier or other unique identifier that may be used by the orchestrator component 230, skill(s) 290, skill server(s) 225, etc. to track information across the dialog. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog may or may not start with speaking of a wakeword. Each user input of a dialog may be associated with a unique user input identifier such that multiple user input identifiers may be associated with a single dialog identifier. Each instance of a user input and corresponding system action/output may be referred to herein as a "turn" of a dialog.

The satisfaction estimator 450, using one or more trained machine learning models, may generate user satisfaction data 455, which includes a user satisfaction value (e.g., between 1 and 5) indicating a current estimate of the user's satisfaction.

Various machine learning techniques may be used to train and operate models to perform various steps described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
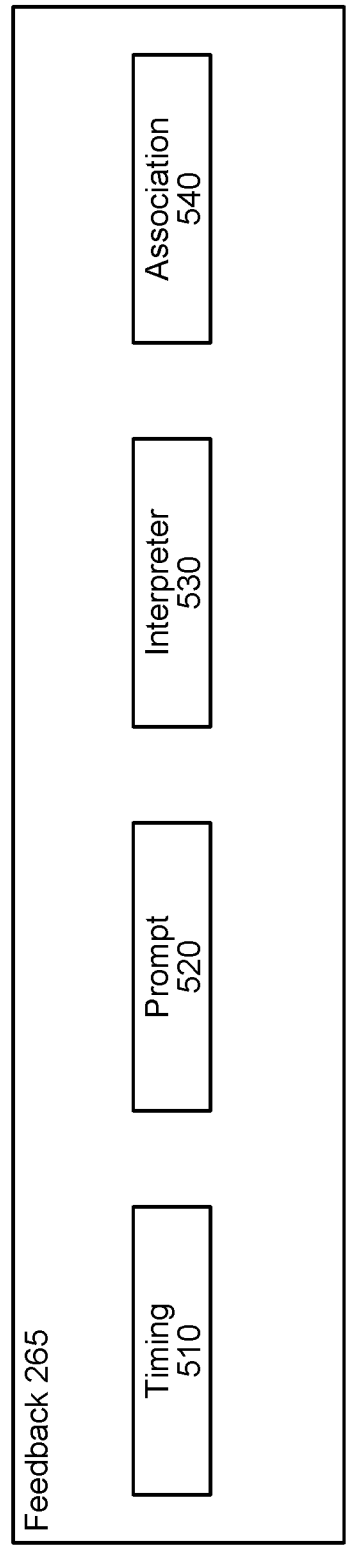
FIG. 5 is a conceptual diagram illustrating a feedback component according to embodiments of the present disclosure.

The system(s) 120 may include a feedback component 265. The feedback component 265 may be implemented as a stand-alone component (as illustrated in FIG. 2) or may be implemented as a skill 290. As illustrated in FIG. 5, the feedback component 265 may include a timing component 510, a prompt component 520, an interpreter component 530, and an association component 540.

Figure 6:
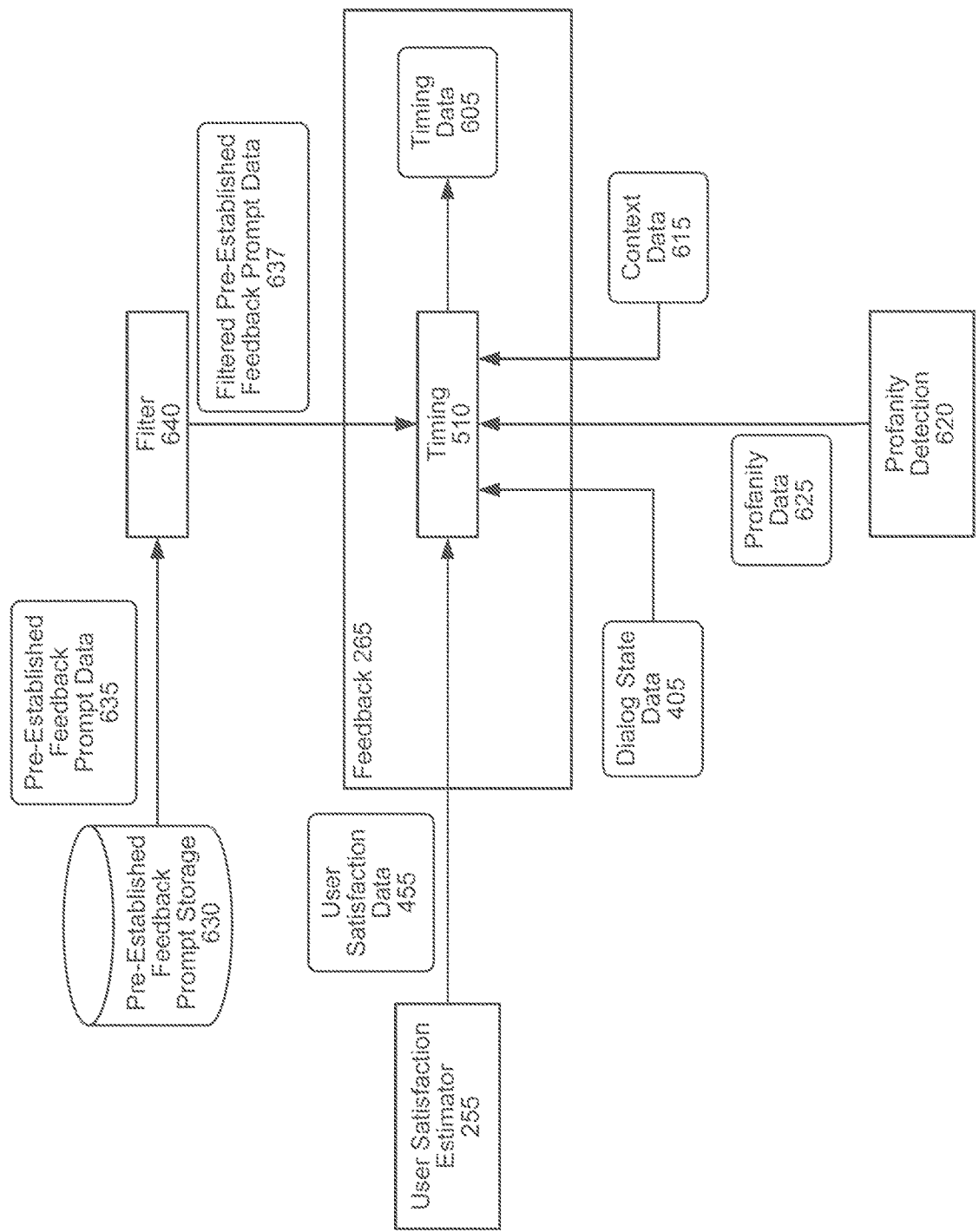
FIG. 6 is a conceptual diagram illustrating how a system may determine if it is appropriate to request feedback from a user according to embodiments of the present disclosure.

The timing component 510 may implement one or more trained machine learning models configured to determine when it is appropriate to request feedback from a user (as illustrated in FIG. 6). That is, the timing component 510 may be configured to indicate feedback should be requested when the timing component 510 determines the user will likely provide unbiased feedback. For example, if a user uses a skill often, the timing component 510 may determine feedback regarding the skill should not be requested after the system(s) 120 receives (from the user) a user input invoking the skill as such feedback may be biased due to the user recently invoking their favorite skill. For example, in response to the system(s) 120 receiving (from the user) a user input invoking a different skill, the system may determine it is a good time to request feedback regarding the often invoked skill.

The timing component 510 may output timing data 605, which may include a value representing the timing component 510's determination that feedback should be requested. A higher value in the timing data 605 may corresponding to an increased likelihood that feedback should be requested, and vice versa. The value in the timing data 605 may be a numeric value (e.g., on a 1 to 10 scale) or a binned value (e.g., high, medium, low).

The timing component 510 may receive user satisfaction data 455 output by the user satisfaction estimator 255. As detailed above, the user satisfaction data 455 may represent a current estimate of the user's satisfaction. The higher the user's satisfaction (as represented in the user satisfaction data 455), the higher the value that may be represented in the timing data 605, and vice versa.

The timing component 510 may be configured to receive various portions of dialog state data 405. The timing component 510 may receive ASR results data (as part of dialog state data 405 although not illustrated in FIG. 4). The timing component 510 may determine how the user formulated the user input as represented in the ASR results data (e.g., text data). Depending on how the user formulated the user input, the timing component 510 may increase or decrease the value represented in the timing data 605.

The timing component 510 may receive ASR results data and/or NLU results data 410, and may determine therefrom that the present user input corresponds to the user attempting to provide the system(s) 120 with feedback that was not requested by the system(s) 120. The timing component 510 may be configured to assume that it is good timing to request feedback when a user is attempting to provide the system(s) 120 with unsolicited feedback. As such, for example, the timing component 510 may increase the value, in the timing data 605, when the timing component 510 determines ASR results data and/or NLU results data represent the user is attempted to provided unsolicited feedback, and vice versa.

The timing component 510 may receive data representing whether the user input was received while the system(s) 120 was outputting content to the user. Such data may be represented in dialog state data 405 although not illustrated in FIG. 4. The timing component 510 may increase or decrease the value, represented in the timing data 605, based on whether the user input was received when the system(s) 120 was outputting content. For example, the timing component 510 may decrease the value if the user input was received when the system(s) 120 was outputting content, as such may indicate an unbeneficial time to request feedback as the user may be unhappy with the content being output and may be trying to reword the user input to cause the desired action to be performed.

The timing component 510 may receive user profile data 435 associated with a top scoring user identifier output by the user recognition component 295. As such, the timing component 510's processes may be user-specific. The user profile data 435 may include electronic calendar information representing instances when the user is busy. The timing component 510 may decrease the value in the timing data 605 if the timing component 510 determines the user will be busy within a threshold amount of time, as determined by a comparison of the electronic calendar information with present time data (which may be received as part of context data 615). Likewise, the timing component 510 may increase the value in the timing data 605 if the timing component 510 determines the user will not be busy within a threshold amount of time.

The user profile data 435 may represent a duration of time that the user profile has been active (e.g., a duration of time that the user has been a user of the system(s) 120). The timing component 510 may be configured to assume that newer users may be more willing to provide feedback than users that have used the system for a significant amount of time. Thus, for example, the timing component 510 may increase the value, in the timing data 605, if the duration of time represented in the user profile data is below a threshold duration of time, and vice versa.

The timing component 510 may receive various context data 615, including but not limited to the present time data referred to above. In some examples, the timing component 510 may issue a query to a context service of the system(s) 120, with the query requesting all current context data 615 associated with the top scoring user identifier output by the user recognition component 295.

The timing component 510 may receive context data 615 representing system usage data associated with the top scoring user identifier as output by the user recognition component 295. The system usage data may represent various previous user inputs of the user. For example, the system usage data may represent the user has recently asked for the weather, asked for the time, asked for their calendar appointments for the day, etc. This may reflect a user's morning routine and it may be unbeneficial for the system(s) 120 to interrupt a user's routine to request feedback. Thus, for example, if the timing component 510 determines the system usage data represents the user has provided at least a threshold number of user inputs within a past threshold amount of time, the timing component 510 may decrease the value represented in the timing data 605 (which reflects a determination of the timing component 510 that it may be unbeneficial to interrupt the user who may want to continue providing user inputs to the system(s) 120), and vice versa.

The system usage data may additionally or alternatively represent previous instances when the user has provided the system with feedback (either requested feedback or user-volunteered feedback). The timing component 510 may extrapolate, from such system usage data, when the user may be willing to provide feedback. If a present time corresponds to an extrapolated time of when the user may be willing to provide feedback, the timing component 510 may increase the value in the timing data 605, and vice versa.

The system usage data may additionally or alternatively represent previous instances when the system has requested feedback from the user. The timing component 510 may be configured to only output timing data 605, representing feedback should be requested, if the system has not requested feedback from the user too many times over a duration of time. Thus, for example, the timing component 510 may determine, in the system usage data, a number of times the system has requested feedback from the user over a past amount of time (e.g., a past hour, a past day, a past week, etc.). The timing component 510 may determine whether the number of times meets or exceeds a threshold number of times. If the timing component 510 determines the number of times meets or exceeds the threshold number of times, the timing component 510 may not output timing data 605 including one or more values that represent feedback should be requested. In some examples, the timing component 510 may simply not output timing data 605 when the timing component 510 determines the number of times meets or exceeds the threshold number of times.

The timing component 510 may receive profanity data 625 from a profanity detection component 620 (which may be implemented by the system(s) 120). The profanity detection component 620 may receive ASR results data and/or NLU results data and may process such data to determine whether the user input includes profanity. The profanity data 625 may indicate whether or not the user input includes profanity, as determined by the profanity detection component 620. The timing component 510 may decrease the value, in the timing data 605, in response to the profanity data 625 indicating the user input included profanity, and vice versa.

Additionally or alternatively to the data described above, the timing component 510 may consider a length of time between the present user input and a most recent previous user input of the user; a number of weekly dialogs the user engages in with the system; and the numbers of times the user uses certain features of the system during each day, week, month, etc.

The timing component 510 may consider the number of data points it processes in determining whether feedback should be recommended. For example, the timing component 510 may increase the value, in the timing data 605, if the number of data points (e.g., corresponding to the data represented by dialog state data, the profanity data, the user satisfaction data, and the context data) fails to satisfy a threshold number of data points, and vice versa.

The system(s) 120 may include a conversation recovery component configured to perform various actions in response to determining error conditions with respect to ASR processing and/or NLU processing. An ASR error condition refers to a situation when the ASR component 250 is unable to transcribe a spoken user input into a textual representation thereof with at least a threshold confidence. A NLU error condition refers to a situation when the NLU component 260 is unable to determine an intent of the user with at least a threshold confidence. Actions that may be performed by the conversation recovery component include requesting the user re-speak a spoken user input, requesting the user reformulate the user input, recommending a top-rated skill to the user, etc. The timing component 510 may receive data from the conversation recovery component, with the data representing the conversation recovery component recommends the system(s) 120 request feedback from the user. The timing component 510 may increase the value, in the timing data 605, if the timing component 510 receives such data from the conversation recovery component.

The timing component 510 may weight different data differently. For example, profanity data 625, representing the user input includes profanity, may be considered a rather strong signal that feedback should not be requested at the present time (e.g., after an action responsive to the user input is performed) since the user may be frustrated and may therefore provide biased feedback. As such, the timing component 510 may weight such profanity data 625 more than other received data.

A domain, skill, device functionality, system functionality, etc. may be associated with pre-established feedback prompts that may be output to users. Each feedback prompt may be associated with specific criteria that should be present for the corresponding feedback prompt to be output. FIG. 7 illustrates example pre-established feedback prompts. As illustrated in FIG. 7, a pre-established feedback prompt may be associated with an identifier of a domain, skill, functionality, or the like; feedback prompt content that may be output to a user in the form of audio and/or text; and criteria that should be satisfied in order for the corresponding feedback prompt content to be output. In at least some examples, domains, skills, functionalities, etc. that were created within a past threshold amount of time may be associated with the same or similar pre-established feedback prompts.

Referring back to FIG. 6, the system(s) 120 may include a pre-established feedback prompt storage 630 that stores pre-established feedback prompts for various domains, skill, functionalities, etc. (such as those illustrated in FIG. 7). The system(s) 120 may also include a filter 640. The filter 640 may receive pre-established feedback prompt data 635 from the pre-established feedback prompt storage 630. The filter 640 may receive the top scoring user identifier as output by the user recognition component 295. The filter 640 may determine user profile data associated with the top scoring user identifier, and may determine which domains, skills, and functionality are indicated as enabled in the user profile data. The filter 640 may output filtered pre-established feedback prompt data 637 representing only pre-established feedback prompts associated with domains, skills, and functionality indicated as enabled in the user profile data.

The timing component 510 may be configured to generate timing data 605, where the timing data 605 includes a value for each pre-established feedback prompt represented in the filtered pre-established feedback prompt data 637. A value associated with a particular pre-established feedback prompt may by influenced by the timing component 510's processing of various data as described above. A value may additionally or alternatively reflect the timing component 510's processing with respect to the criteria associated with the pre-established feedback prompt. For example, the timing component 510 may generate a lower value for a pre-established feedback prompt with at least some criteria that is unsatisfied than a value for a pre-established feedback prompt with all criteria satisfied.

The data used to train the model(s) of the timing component 510 may include instances representing past successful and/or past unsuccessful feedback prompts. A past successful feedback prompt may be an instance in which a user provided unbiased feedback (e.g., as determined by one or more individuals) in response to the feedback prompt. A past unsuccessful feedback prompt may be an instance in which a user did not provide feedback (or provided biased feedback) in response to a feedback prompt. Each instance of a past feedback prompt, represented in the training data, may include an indicator representing whether the feedback prompt was successful or not, and dialog state data, context data, profanity data, and/or user satisfaction data associated with the feedback prompt. With enough data, the model(s) may observe trends such that the model(s) is able to determine whether a context surrounding a present user input indicates feedback should be requested or not.

In some examples, the timing component 510 may determine feedback should not be requested. Such may be reflected in the timing data 605. Timing data 605, indicating feedback should not be requested, may be sent to devices or systems associated with various domains of the system. The recipient domains may adjust processing based on receiving such timing data. For example, a marketing domain may be configured to send marketing communications (e.g., emails, short message service (SMS) messages, etc.) at regular intervals. However, in response to receiving the foregoing timing data, the marketing domain may determine not to send a marketing communication to one or more devices associated with the top scoring user identifier output by the user recognition component 295, as such may frustrate the user.

In some examples, the timing component 510 may only output timing data 605, representing feedback should be requested, if such determination of the timing component 510 is in agreement with determinations of a different system component.

Figure 8:
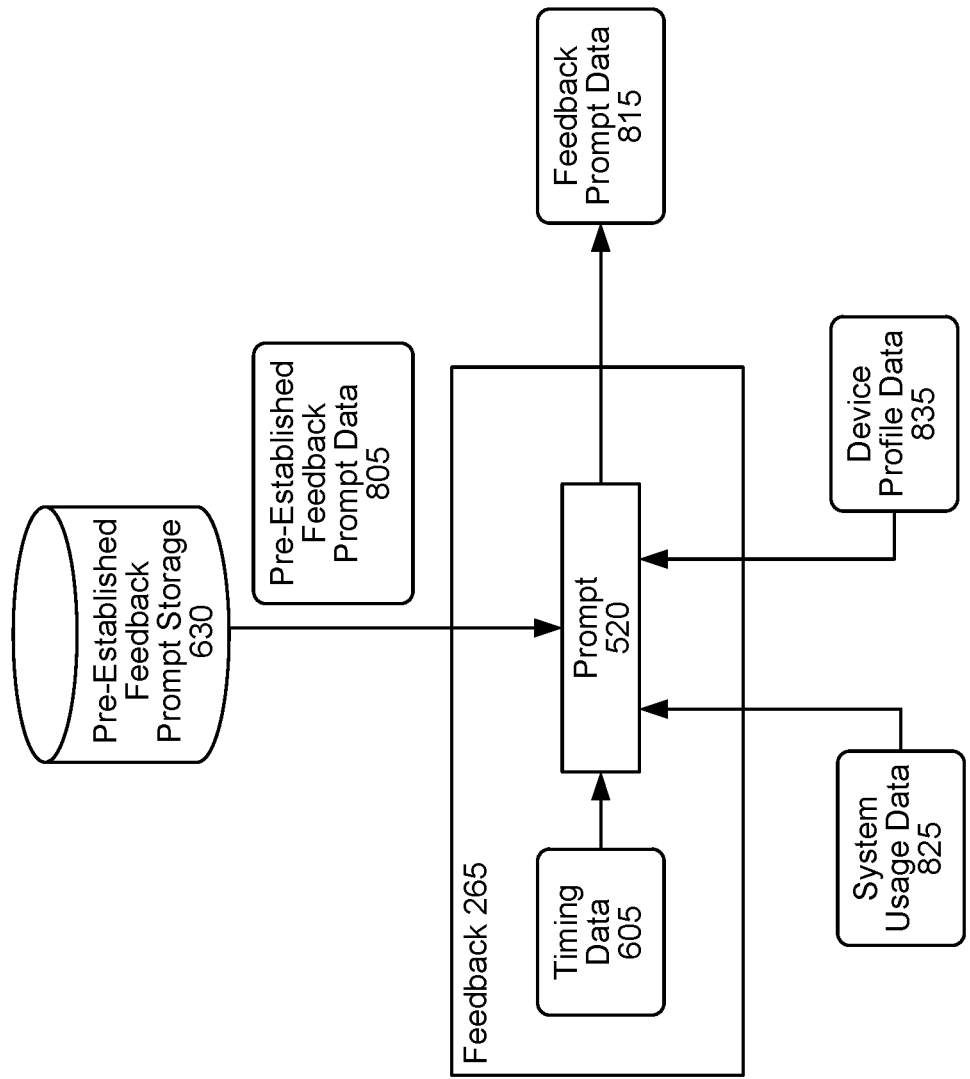
FIG. 8 is a conceptual diagram illustrating how a system may generate a feedback prompt according to embodiments of the present disclosure.

As described above, the feedback component 265 may include a prompt component 520. The prompt component 520 may generate a feedback prompt to be output to the user (as illustrated in FIG. 8). The prompt component 520 may receive the timing data 605, output by the timing component 510, and may output feedback prompt data 815 representing feedback prompt content that is to be output to the user in the form of audio and/or text.

The prompt component 520 may determine a top scoring value, in the timing data 605, corresponds to a pre-established feedback prompt. When this occurs, the prompt component 520 may identify the pre-established feedback prompt (represented as pre-established feedback prompt data 805), in the pre-established feedback prompt storage 630. The prompt component 520 may include the pre-established feedback prompt in the feedback prompt data 815.

In some examples, the prompt component 520 may determine a top scoring value, in the timing data 605, does not correspond to a pre-established feedback prompt. For example, the prompt component 520 may determine timing data 605 simply includes a single value representing feedback should be requested from the user. This may occur in situations where the timing component 510 does not process filtered pre-established feedback prompt data 635.

The prompt component 520 may implement one or more trained machine learning models for determining, in instances where the timing data does not represent a pre-established feedback prompt, which feedback prompt to include in the feedback prompt data 815. Feedback prompts, which may be output by such determinations of the model(s), may relate to requesting feedback regarding the system(s) 120's processing of the present user input (e.g., may request feedback regarding a domain or skill that processed with respect to the present user input), requesting feedback regarding the system(s) 120's processing of a previous user input (e.g., may request feedback regarding a domain or skill that processed with respect to a previous user input received within a past day, week, etc.), requesting feedback regarding a specific previous user experience (e.g., asking a user for feedback regarding whether the system(s) 120 output the correct song when the user was trying to use a lyrics feature to find a song), etc.

Feedback prompts, that may be included in the feedback prompt data 815, may be of varying specificity. The feedback prompts may vary in terms of open-endedness. For example, one feedback prompt may solicit a yes/no response while another feedback prompt may solicit feedback in the form of a narrative. The feedback prompts may vary in terms of specificity of topic. For example, one feedback prompt may solicit feedback regarding a certain feature of the system(s) 120 (e.g., wakeword processing) while another feedback prompt may relate to general system(s) 120 processing (e.g., "how has my understanding been").

The prompt component 520 may consider system usage data 825 when determining which feedback prompt to include in the feedback prompt data 815. The prompt component 520 may receive system usage data 825 associated with a top scoring user identifier output by the user recognition component 295. The system usage data 825 may represent, for example, NLU intents of previous user inputs, system features the user has invoked, etc. The prompt component 520 may generate a feedback prompt that requests feedback regarding various aspects of the system usage data 825.

The system usage data 825 may include information representing system(s) 120 processing of the present user input. Such information may include a domain that has been or is being invoked to perform an action responsive to the user input.

The prompt component 520 may determine how the feedback prompt should be output (e.g., as audio and/or text). The prompt component 520 may represent, in the feedback prompt data 815, how the feedback prompt should be output.

The prompt component 520 may be configured to request feedback in a manner that minimizes user frustration and optimizes a chance the user will provide feedback. The prompt component 520 may implement one or more trained models for determining how a feedback prompt should be output. The logic for determining when a feedback prompt should be output as audio may be different from the logic for determining when a feedback prompt should be output as text via a companion application notification, which may be different from the logic for determining when a feedback prompt should be output as a "card" on a home screen of a display screen, etc.

At least some of the logic may consider input/output capabilities of the device 110 from which the present user input was received. Such input/output capabilities may be represented in device profile data 835 corresponding to the device 110 from which the user input was received. As an example, if the prompt component 520 determines the device profile data 835 represents at least one speaker but not a display, the feedback prompt data 815 may represent the feedback prompt should be output as audio. For further example, if the prompt component 520 determines the device profile data 835 represents at least one speaker and a display, the feedback prompt data 815 may represent the feedback prompt may be output as audio and/or text.

The orchestrator component 230 (or another component of the system(s) 120) may cause the device 110 to output the feedback prompt as indicated in the feedback prompt data 815. For example, if the feedback prompt is text data to be output as text, the orchestrator component 230 may send the text data to the device 110 along with an instruction to display the text data. For further example, if the feedback prompt is text data to be output as audio, the orchestrator component 230 may cause the TTS component 280 to generate audio data representing the feedback prompt text data. The orchestrator component 230 may send the audio data to the device 110 along with an instruction to output the audio data.

As described, the feedback component 265 may include a prompt component 520 configured to generate a feedback prompt to be output to the user. In some examples, the feedback component 265 may be configured as a service provided to various domains, skills, and the like. When so configured, the feedback component 265 may not generate feedback prompt data 815 as described above. Rather, the feedback component 265 may output the timing data 605 to one or more different domains, skills, etc. The recipient domains, skills, etc. may then individually have the flexibility to determine whether feedback for the domain, skill, etc. should be requested. In such implementation, the individual domains, skills, etc. may store or create feedback prompts, thereby negating a need for the feedback component 265 to communicate directly with a pre-established feedback prompt storage 630. For example, a domain, skill, etc. may send the feedback component 265 a feedback prompt at runtime.

The system(s) 120 may be configured to endpoint audio data (for the purposes of ASR processing) based on lengths of traditional spoken user inputs. Spoken feedback may, in at least some examples, be longer than traditional spoken user inputs upon which the system(s) 120's ASR endpointing is trained (e.g., when a feedback prompt is open-ended, thereby inviting a user to provide feedback in the form of a narrative). Such lengthy spoken feedbacks may result in ASR endpointing errors. For example, if the spoken feedback is significantly longer than a traditional spoken user input and/or if the spoken feedback includes pauses between words, the system(s) 120 could determine an improper endpoint of the spoken feedback.

Accordingly, the system(s) 120 may include ASR endpointing rules unique to spoken feedback instances. The unique endpointing rules may cause the device 110 to capture audio data longer than the device 110 would have if the system(s) 120 was implementing the traditional ASR endpointing rules. When the system(s) 120 sends the feedback prompt data to the device 110, the system(s) 120 may also send, to the device 110, an instruction to leave its microphone(s) on until instructed otherwise by the system(s) 120. As a result, the device 110 may capture audio data until the system(s) 120 determines a proper endpoint of spoken feedback. Such a configuration reduces the chance of the system(s) 120 determining an improper endpoint of spoken feedback in audio data. The device 110 may output an indicator (e.g., activate a light of the device 110, output TTS-generated synthesized speech) representing the device 110's microphone(s) will be left on longer than usual to ensure an entirety of the spoken feedback is captured.

Figure 9:
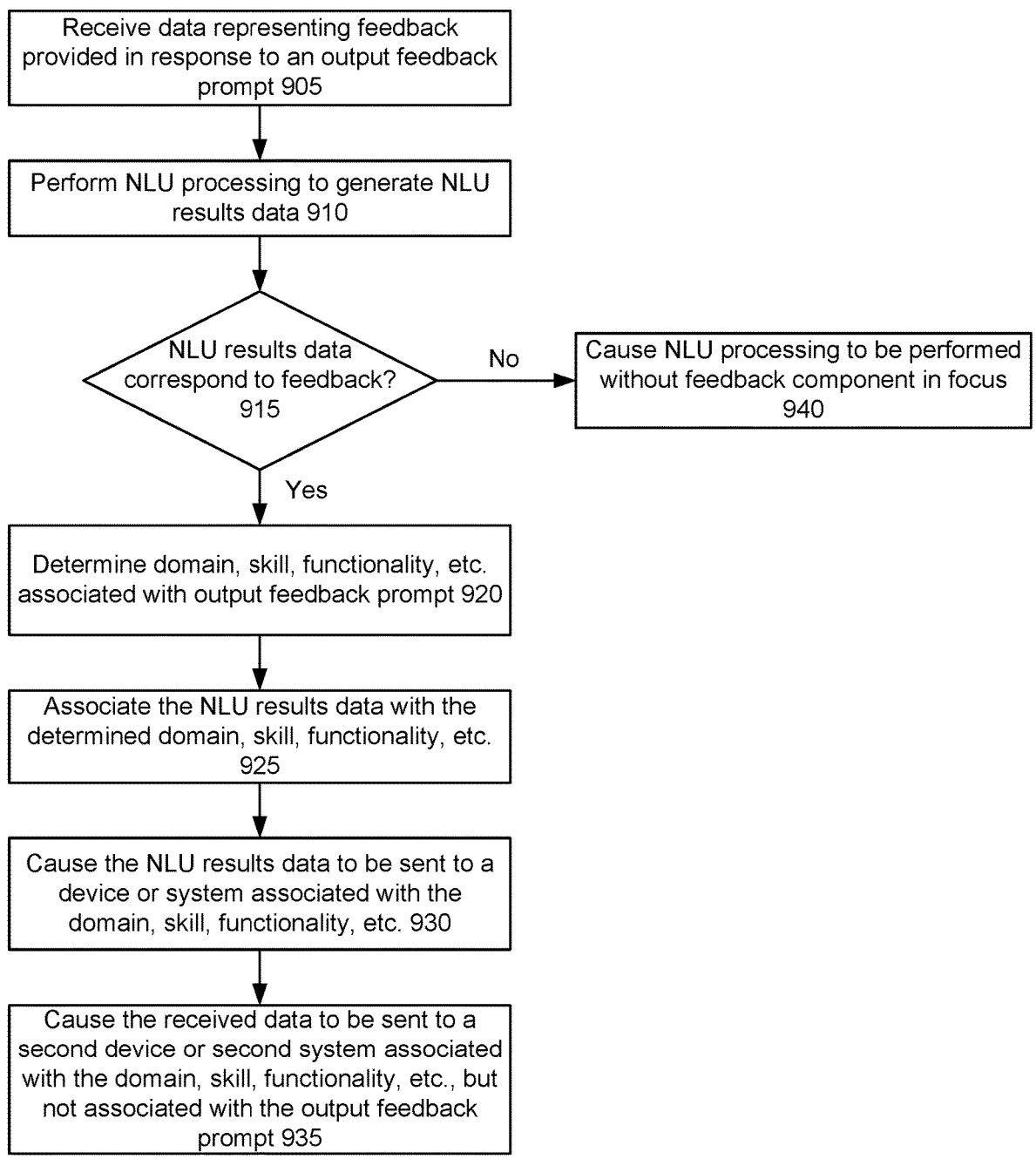
FIG. 9 is a process flow diagram illustrating how a system may associate requested feedback with a domain, skill, etc. according to embodiments of the present disclosure.

The system(s) 120 may receive (905) data (e.g., audio data or text data) representing a user input provided in response to the output feedback prompt (as illustrated in FIG. 9). If the system(s) 120 receives audio data, the system(s) 120, and more particularly the ASR component 250, may perform ASR processing on the audio data to generate text data representing the user input. The system(s) 120, and more particularly the NLU component 260, may perform (910) NLU processing on text data (either as received at step 905 or as output by the ASR component 250) to generate NLU results data.

The interpreter component 530 may receive the NLU results data and determine (915) whether the NLU results data corresponds to feedback. For example, the interpreter component 530 may determine the NLU results data corresponds only to feedback, may determine the NLU results data corresponds only to user command, or may determine the NLU results data corresponds to both feedback and a user command.

The interpreter component 530 may process NLU results data of previous turns of the same dialog as the present user input (e.g., associated with the same dialog identifier). The interpreter component 530 may determine whether the user input corresponds to feedback, a command, or a combination thereof using the previous turns of the dialog as context. For example, the interpreter component 530 may determine the feedback prompt that was output as part of a previous turn and may determine the present user input corresponds to feedback related to the feedback prompt.

If the interpreter component 530 determines the user input, received at step 905 corresponds feedback, the interpreter component 530 may send the NLU results data to the association component 540. In some examples, the interpreter component 530 may send, to the association component 540 an extrapolation of the feedback rather than the NLU results data. The extrapolation of the feedback may represent the feedback, in the NLU results data in structure processable by the association component 540. But, the extrapolated feedback may not include certain user identifying information such that the domain, skill, etc. that ultimately receives the feedback will not know which user provided the feedback. Sending the extrapolated feedback may preserve user anonymity while still providing valuable feedback to a domain, skill, etc.

The association component 540 may associate the NLU results data with an appropriate domain, skill, functionality, etc.

The association component 540 may determine (920) a domain, skill, functionality, etc. that was associated with the output feedback prompt. For example, the association component 540 may determine the output feedback prompt corresponds to a pre-established feedback prompt and may determine the domain, skill, functionality, etc. associated with the pre-established feedback prompt.

The association component 540 may associate (925) the NLU results data (and/or optionally the data received at step 905) with the determined domain, skill, functionality, etc. For example, the association component 540 may store an association between the NLU results data (and/or optionally the data received at step 905) and an identifier of the determined domain, skill, functionality, etc.

The association component 540 may cause (930) the NLU results data (and/or optionally the data received at step 905) to be sent to a device or system associated with the domain, skill, functionality, etc. Such may enable the device or system (or a user of the device or system) to process the NLU results data (and/or optionally the data received at step 905) and perform remedial action(s) such as, for example, following up with the user that provided the feedback to gain further insight; changing processing performed by the domain, skill, functionality, etc.

The association component 540 may cause (935) the NLU results data (and/or optionally the data received at step 905) to be sent to a device or system that is associated with the domain, skill, functionality, etc. but which is not associated with the output feedback prompt. For example, the association component 540 may receive data representing feedback indicating that content output by an information source, of an information domain, was incorrect. In other words, the original user input may have corresponded to a question and the information source's answer to the question was not what the user was looking for. The information domain may include various information sources. In this example, the association component 540 may cause the NLU results data (and/or optionally the data received at step 905) to be sent to the information source that provided the incorrect information. The association component 540, in this example, may additionally cause the NLU results data (and/or optionally the data received at step 905) to be sent to a second information source of the same information domain. Such may enable the second information source to take remedial action(s) (e.g., delete the incorrect information) even though the second information source was not directly related to the output feedback prompt.

The association component 540 may perform processing to ensure user anonymity with respect to at least the device or system not associated with the output feedback prompt. The association component 540 may create derived feedback data from the feedback received from the user. The derived feedback data may be configured such that the device or system would have a more difficult time (or being unable to) identifying the user from the derived feedback data than the device or system would from the received feedback.

For example, the derived feedback data may not include a user identifier or specific user profile information that the user has permitted to be shared with the system component associated with the feedback prompt, but which the user has not explicitly permitted to be shared with the system component not associated with the feedback prompt.

The association component 540 may implement one or more trained machine learning models for determining devices or systems, which are not directly related to the output feedback prompt, that should receive the data representing the feedback. Using the above information domain and information sources example, the association component 540 may determine to send the data (representing the feedback) to the second information source since the second information source is associated with the same domain (e.g., the information domain) as the information source that was invoked to respond to the user input. Other examples are possible.

The NLU processing performed to generate the NLU results data, discussed with respect to FIG. 9 above, may be performed with the feedback component 265 "in focus." In other words, since the feedback component 265 caused the most recent system output (e.g., the feedback prompt) to be output, NLU processing, performed at step 910, may be performed to bias the NLU results data to correspond to the feedback component 265.

As stated above, the interpreter component 530, of the feedback component 265, may determine the NLU results data includes a user command. If the interpreter component 530 determines such, the interpreter component 530 may cause (940) the NLU component 260 to perform NLU processing without the feedback component 265 in focus. The interpreter component 530 may send, to the orchestrator component 230, an indicator representing NLU processing should be performed without the feedback component 265 in focus. The orchestrator component 230 may send the indicator (or a derivation thereof) to the NLU component 260, which may cause the NLU component 260 to perform such NLU processing. The foregoing may enable the NLU component 260 to process text data (either received at step 905 or as output from ASR processing) in an attempt to determine one or more domains to which the user input likely corresponds, without favoring the feedback component 265.

As stated above, the interpreter component 530 may determine the NLU results data includes both feedback and a user command. When this occurs, the interpreter component 530 may bifurcate processing. The interpreter component 530 may isolate the portion of the NLU results data corresponding to the feedback, and may send that portion of the NLU results data to the association component 540, which may process as described above. The interpreter component 530 may also cause NLU processing to be performed as described with respect to step 940.

The foregoing bifurcated processing may be different from how a skill may be configured to process. A skill may be configured to process certain data. If a skill receives data the skill is not configured to process, the skill may simply output an indicator representing the skill cannot process the data. This may be referred to as an error condition. When this occurs, the system(s) 120 may, in some examples, cease processing with respect to the user input. This may be contrasted with the feedback component 265's processing as described above. That is, instead of the feedback component 265 (which may be implemented as a skill) outputting an indicator representing an error condition when the feedback component 265 receives NLU results data representing a user command the feedback component 265 cannot process, the feedback component 265 may cause NLU processing to be performed without the feedback component 265 being in focus. This provides the system(s) 120 with an opportunity to remove an error condition that may have otherwise resulted in the ending of processing with respect to the user command.

Figure 10:
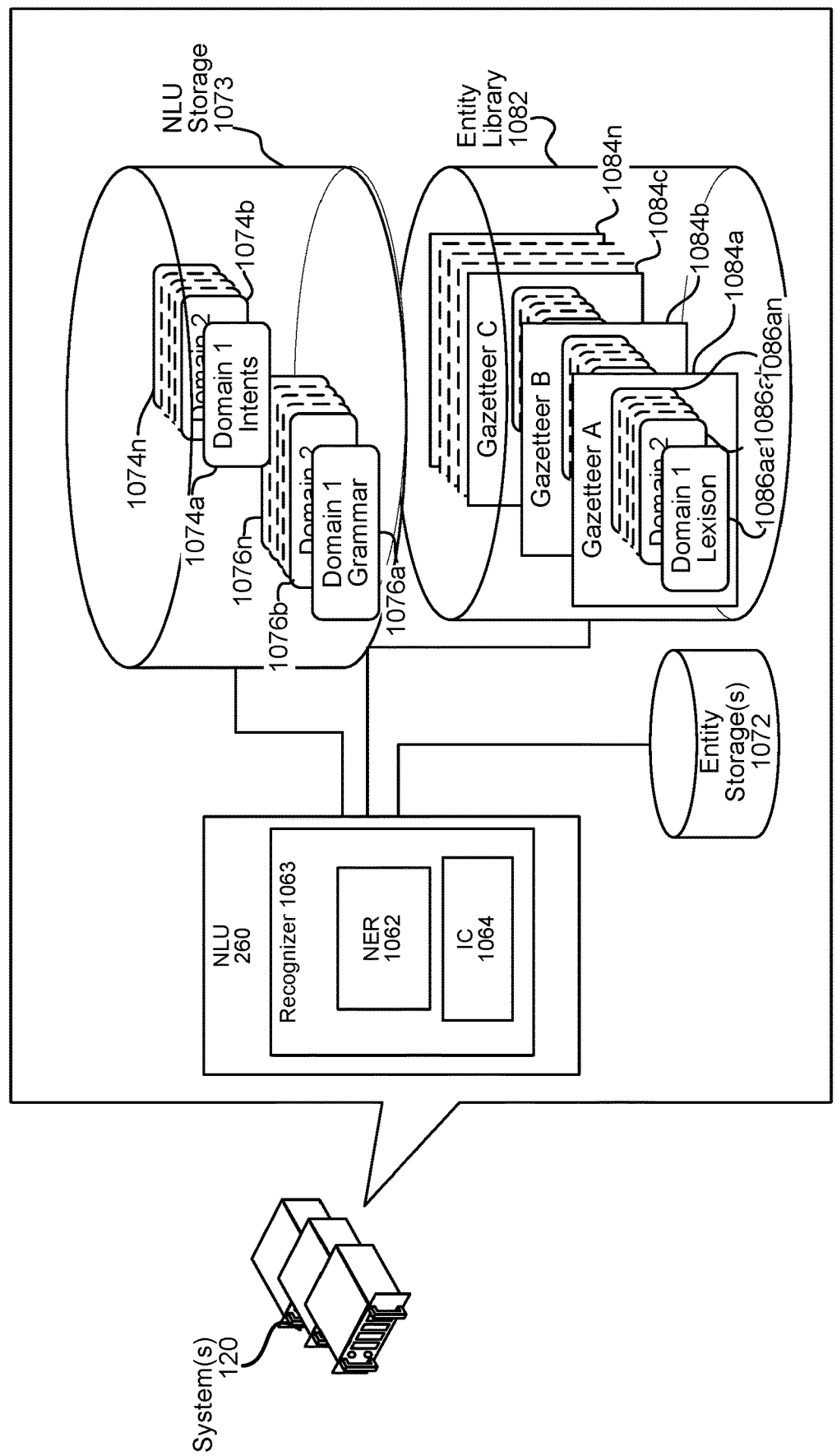
FIG. 10 is a conceptual diagram illustrating how NLU processing may be performed according to embodiments of the present disclosure.
Figure 11:
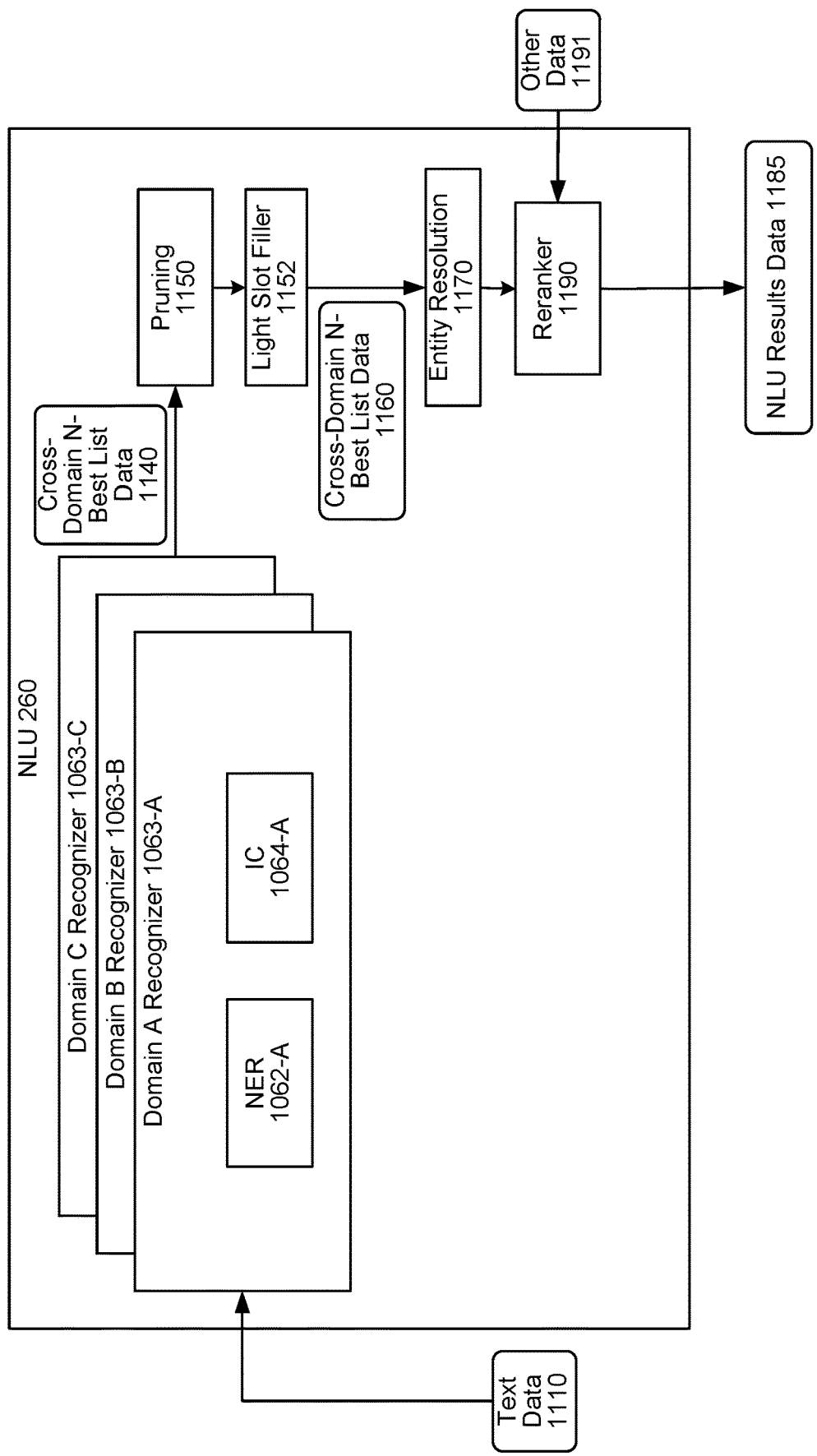
FIG. 11 is a conceptual diagram illustrating how NLU processing may be performed according to embodiments of the present disclosure.

FIGS. 10 and 11 illustrate how the NLU component 260 may perform NLU processing to generate NLU results data. The NLU component 260 may process text data including several ASR hypotheses of a single user input. For example, if the ASR component 250 outputs text data including an n-best list of ASR hypotheses (with each ASR hypothesis corresponding to a different textual representation of the user input), the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

As illustrated in FIG. 10, the NLU component 260 may include one or more recognizers 1063. Each recognizer 1063 may be associated with a different domain (e.g., smart home, video, music, weather, custom, etc.).

Each recognizer 1063 may include a named entity recognition (NER) component 1062. The NER component 1062 attempts to identify grammars and lexical information that may be used to construe meaning with respect to text data input therein. The NER component 1062 identifies portions of text data that correspond to a named entity associated with a domain, associated with the recognizer 1063 implementing the NER component 1062. The NER component 1062 (or other component of the NLU component 260) may also determine whether a word refers to an entity whose identity is not explicitly mentioned in the text data, for example "him," "her," "it" or other anaphora, exophora, or the like.

Each recognizer 1063, and more specifically each NER component 1062, may be associated with a particular grammar database 1076, a particular set of intents/actions 1074, and a particular personalized lexicon 1086. Each gazetteer 1084 may include domain-indexed lexical information associated with a particular user and/or device 110. For example, a Gazetteer A (1084a) includes domain-indexed lexical information 1086aa to 1086an. A user's music domain lexical information might include album titles, artist names, and song names, for example, whereas a user's communications domain lexical information might include the names of contacts. Since every user's music collection and contact list is presumably different, this personalized information improves later performed entity resolution.

An NER component 1062 applies grammar information 1076 and lexical information 1086 associated with a domain (associated with the recognizer 1063 implementing the NER component 1062) to determine a mention of one or more entities in text data. In this manner, the NER component 1062 identifies "slots" (each corresponding to one or more particular words in text data) that may be useful for later processing. The NER component 1062 may also label each slot with a type (e.g., noun, place, city, artist name, song name, etc.).

Each grammar database 1076 includes the names of entities (i.e., nouns) commonly found in speech about the particular domain to which the grammar database 1076 relates, whereas the lexical information 1086 is personalized to the user and/or the device 110 from which the user input originated. For example, a grammar database 1076 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (1084a-1084n) stored in an entity library storage 1082. The gazetteer information 1084 may be used to match text data (representing a portion of the user input) with text data representing known entities, such as song titles, contact names, etc. Gazetteers 1084 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1063 may also include an intent classification (IC) component 1064. An IC component 1064 parses text data to determine an intent(s) (associated with the domain associated with the recognizer 1063 implementing the IC component 1064) that potentially represents the user input. An intent represents to an action a user desires be performed. An IC component 1064 may communicate with a database 1074 of words linked to intents. For example, a music intent database may link words and phrases such as "quiet," "volume off," and "mute" to a <Mute> intent. An IC component 1064 identifies potential intents by comparing words and phrases in text data (representing at least a portion of the user input) to the words and phrases in an intents database 1074 (associated with the domain that is associated with the recognizer 1063 implementing the IC component 1064).

The intents identifiable by a specific IC component 1064 are linked to domain-specific (i.e., the domain associated with the recognizer 1063 implementing the IC component 1064) grammar frameworks 1076 with "slots" to be filled. Each slot of a grammar framework 1076 corresponds to a portion of text data that the system believes corresponds to an entity. For example, a grammar framework 1076 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1076 may not be structured as sentences, but rather based on associating slots with grammatical tags.

For example, an NER component 1062 may parse text data to identify words as subject, object, verb, preposition, etc. based on grammar rules and/or models prior to recognizing named entities in the text data. An IC component 1064 (implemented by the same recognizer 1063 as the NER component 1062) may use the identified verb to identify an intent. The NER component 1062 may then determine a grammar model 1076 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 1062 may then search corresponding fields in a lexicon 1086 (associated with the domain associated with the recognizer 1063 implementing the NER component 1062), attempting to match words and phrases in text data the NER component 1062 previously tagged as a grammatical object or object modifier with those identified in the lexicon 1086.

An NER component 1062 may perform semantic tagging, which is the labeling of a word or combination of words according to their type/semantic meaning. An NER component 1062 may parse text data using heuristic grammar rules, or a model may be constructed using techniques such as Hidden Markov Models, maximum entropy models, log linear models, conditional random fields (CRF), and the like.

For example, an NER component 1062 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1062 identifies "Play" as a verb based on a word database associated with the music domain, which an IC component 1064 (also implemented by the music domain recognizer) may determine corresponds to a <PlayMusic> intent. At this stage, no determination has been made as to the meaning of "mother's little helper" or "the rolling stones," but based on grammar rules and models, the NER component 1062 has determined the text of these phrases relates to the grammatical object (i.e., entity) of the user input represented in the text data.

An NER component 1062 may tag text data to attribute meaning thereto. For example, an NER component 1062 may tag "play mother's little helper by the rolling stones" as: {domain} Music, {intent}<PlayMusic>, {artist name} rolling stones, {media type} SONG, and {song title} mother's little helper. For further example, the NER component 1062 may tag "play songs by the rolling stones" as: {domain} Music, {intent}<PlayMusic>, {artist name} rolling stones, and {media type} SONG.

Text data 1110 may be input into a recognizer 1063. The recognizer 1063 may output tagged text data generated by an NER component 1062 and an IC component 1064, as described herein above. The NLU component 260 may compile the output tagged text data of the recognizers 1063 into a single cross-domain n-best list 1140 and may send the cross-domain n-best list 1140 to a pruning component 1150. Each entry of tagged text (e.g., each NLU hypothesis) represented in the cross-domain n-best list data 1140 may be associated with a respective score indicating a likelihood that the NLU hypothesis corresponds to the domain associated with the recognizer 1063 from which the NLU hypothesis was output. For example, the cross-domain n-best list data 1140 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 1150 may sort the NLU hypotheses represented in the cross-domain n-best list data 1140 according to their respective scores. The pruning component 1150 may perform score thresholding with respect to the cross-domain NLU hypotheses. For example, the pruning component 1150 may select NLU hypotheses associated with scores satisfying (e.g., meeting and/or exceeding) a threshold score. The pruning component 1150 may also or alternatively perform number of NLU hypothesis thresholding. For example, the pruning component 1150 may select the top scoring NLU hypothesis(es). The pruning component 1150 may output a portion of the NLU hypotheses input thereto. The purpose of the pruning component 1150 is to create a reduced list of NLU hypotheses so that downstream, more resource intensive, processes may only operate on the NLU hypotheses that most likely represent the user's intent.

The NLU component 260 may include a light slot filler component 1152. The light slot filler component 1152 can take text from slots represented in the NLU hypotheses output by the pruning component 1150 and alter them to make the text more easily processed by downstream components. The light slot filler component 1152 may perform low latency operations that do not involve heavy operations such as reference to a knowledge base. The purpose of the light slot filler component 1152 is to replace words with other words or values that may be more easily understood by downstream components. For example, if a NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-domain n-best list data 1160.

The cross-domain n-best list data 1160 may be input to an entity resolution component 1170. The entity resolution component 1170 can apply rules or other instructions to standardize labels or tokens from previous stages into an intent/slot representation. The precise transformation may depend on the domain. For example, for a travel domain, the entity resolution component 1170 may transform text corresponding to "Boston airport" to the standard BOS three-letter code referring to the airport. The entity resolution component 1170 can refer to a knowledge base that is used to specifically identify the precise entity referred to in each slot of each NLU hypothesis represented in the cross-domain n-best list data 1160. Specific intent/slot combinations may also be tied to a particular source, which may then be used to resolve the text. In the example "play songs by the stones," the entity resolution component 1170 may reference a personal music catalog, Amazon Music account, a user profile, or the like. The entity resolution component 1170 may output an altered n-best list that is based on the cross-domain n-best list 1160 but that includes more detailed information (e.g., entity IDs) about the specific entities mentioned in the slots and/or more detailed slot data that can eventually be used by a skill. The NLU component 260 may include multiple entity resolution components 1170 and each entity resolution component 1170 may be specific to one or more domains.

The NLU component 260 may include a reranker 1190. The reranker 1190 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1170.

The reranker 1190 may apply re-scoring, biasing, or other techniques. The reranker 1190 may consider not only the data output by the entity resolution component 1170, but may also consider other data 1191. The other data 1191 may include a variety of information. For example, the other data 1191 may include skill rating or popularity data. For example, if one skill has a high rating, the reranker 1190 may increase the score of a NLU hypothesis that may be processed by the skill. The other data 1191 may also include information about skills that have been enabled by the user that originated the user input. For example, the reranker 1190 may assign higher scores to NLU hypothesis that may be processed by enabled skills than NLU hypothesis that may be processed by non-enabled skills. The other data 1191 may also include data indicating user usage history, such as if the user that originated the user input regularly uses a particular skill or does so at particular times of day. The other data 1191 may additionally include data indicating date, time, location, weather, type of device 110, user identifier, context, as well as other information. For example, the reranker 1190 may consider when any particular skill is currently active (e.g., music being played, a game being played, etc.). The reranker 1190 may output NLU results data 1185.

As illustrated and described, the entity resolution component 1170 is implemented prior to the reranker 1190. The entity resolution component 1170 may alternatively be implemented after the reranker 1190. Implementing the entity resolution component 1170 after the reranker 1190 limits the NLU hypotheses processed by the entity resolution component 1170 to only those hypotheses that successfully pass through the reranker 1190.

The reranker 1190 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

Figure 12:
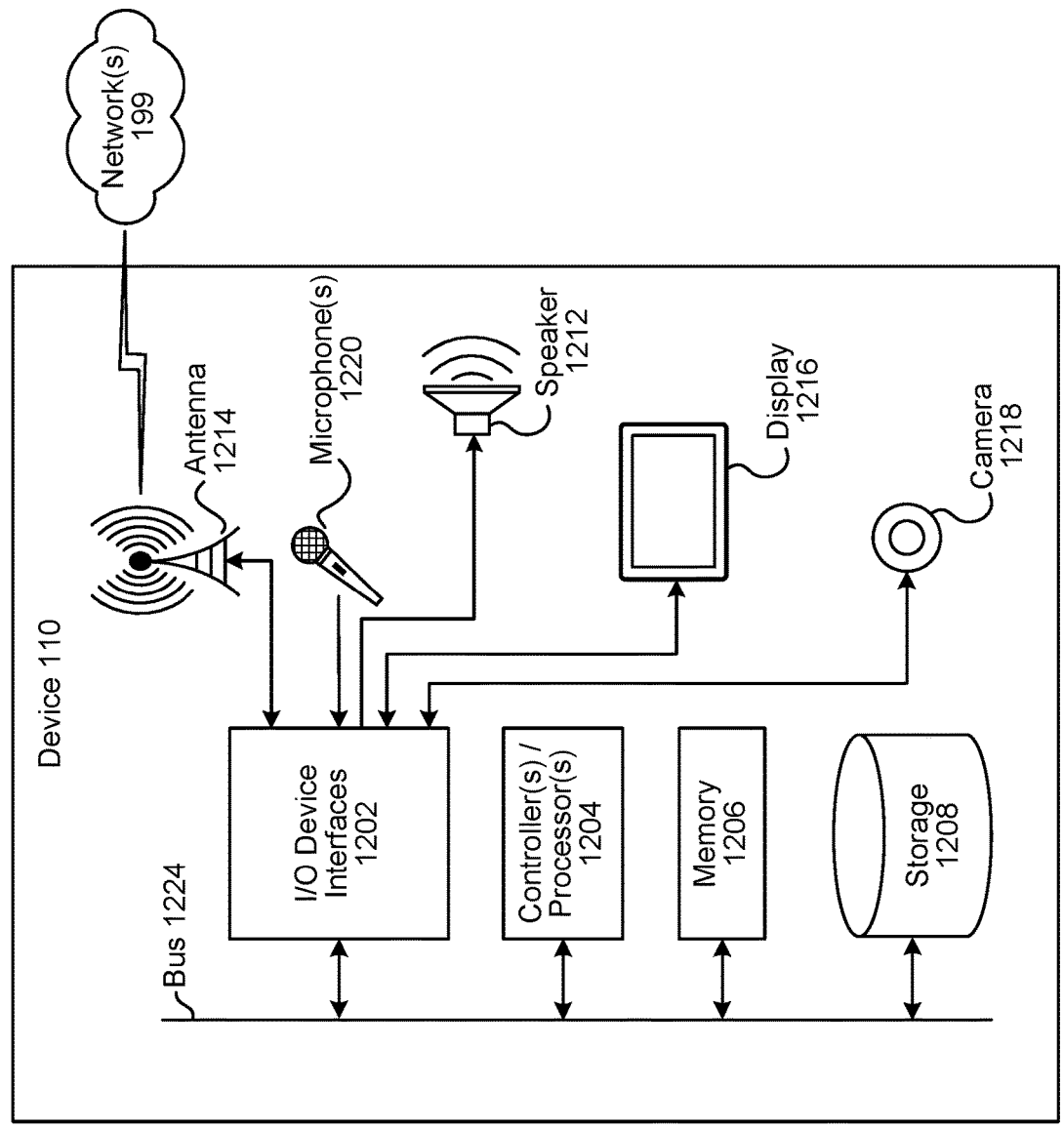
FIG. 12 is a block diagram conceptually illustrating example components of a device according to embodiments of the present disclosure.
Figure 13:
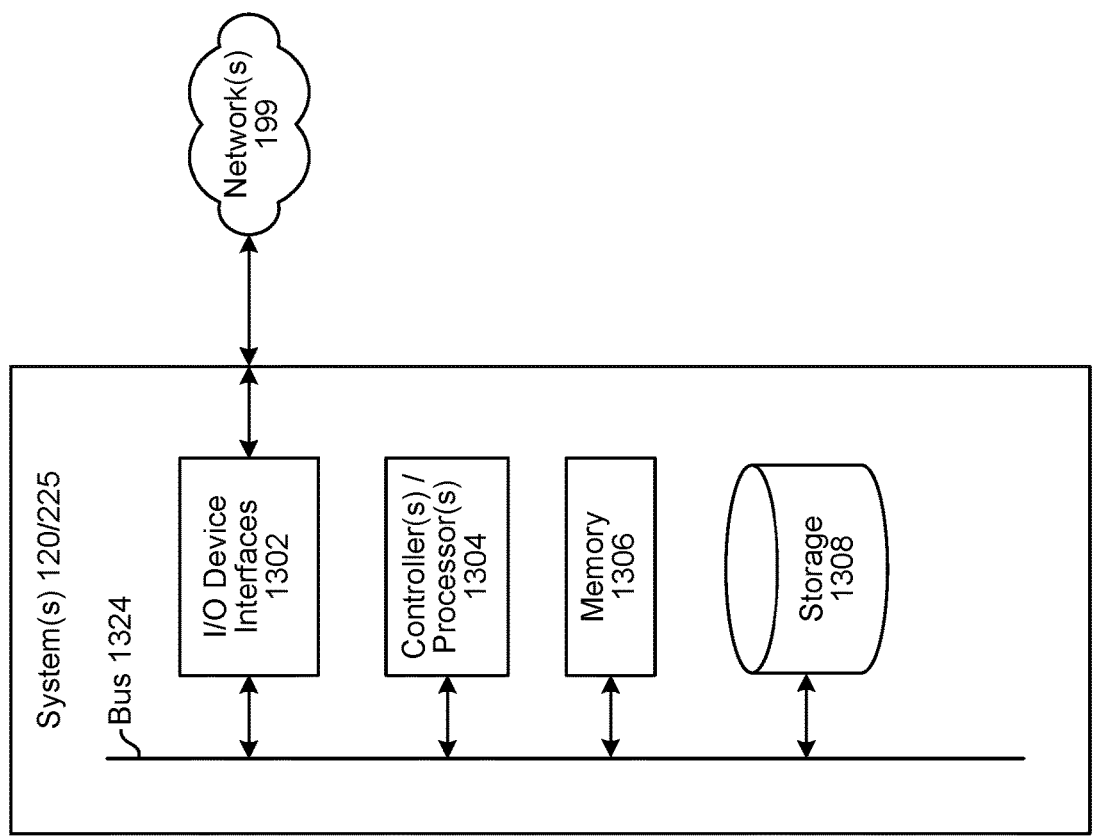
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1202/1302).

Computer instructions for operating each device (110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/225) includes input/output device interfaces (1202/1302). A variety of components may be connected through the input/output device interfaces (1202/1302), as will be discussed further below. Additionally, each device (110/120/225) may include an address/data bus (1224/1324) for conveying data among components of the respective device. Each component within a device (110/120/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1202/1302), processor(s) (1204/1304), memory (1206/1306), and/or storage (1208/1308) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 14:
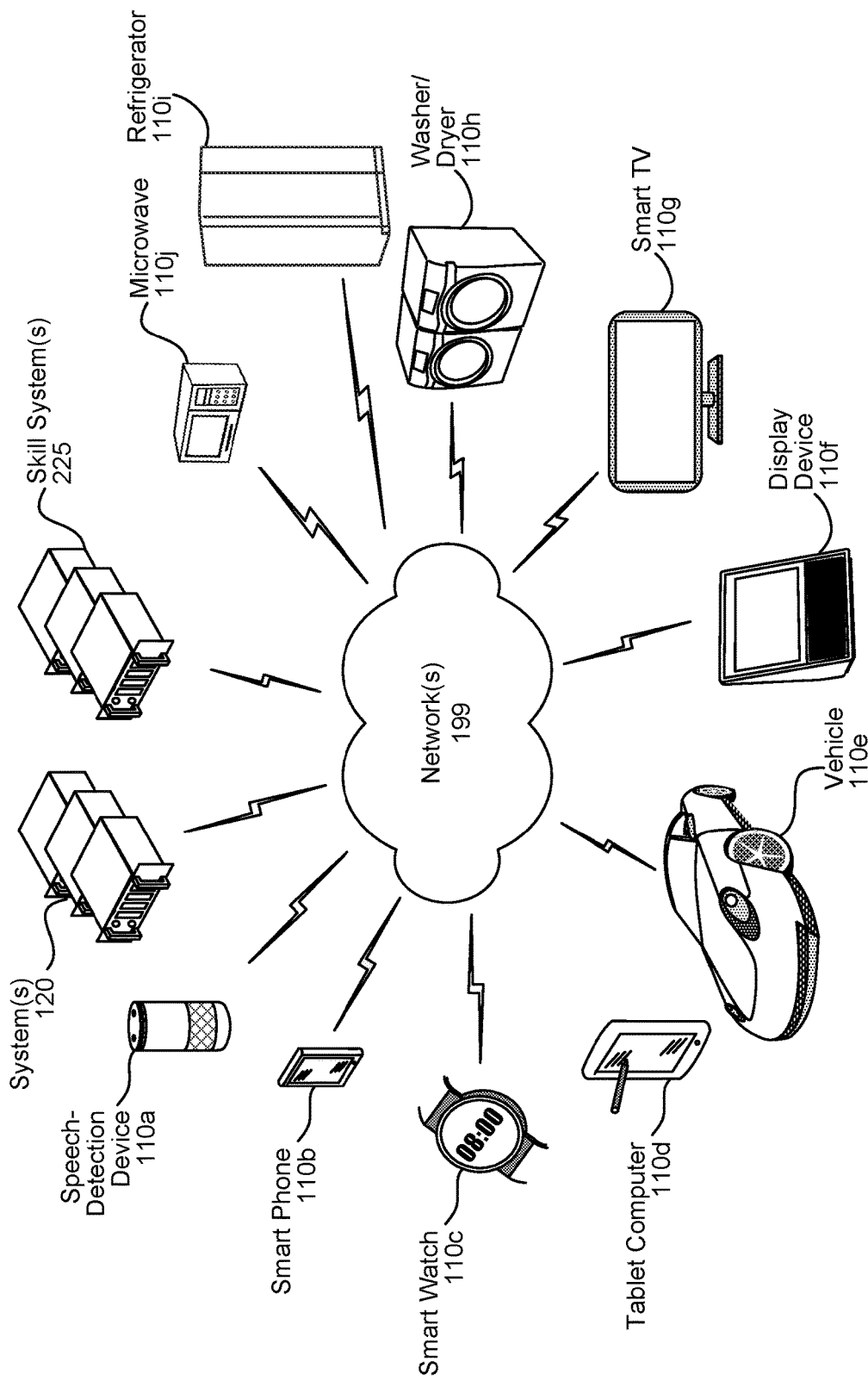
FIG. 14 illustrates an example of a computer network for use with the speech processing system.

As illustrated in FIG. 14, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, first audio data representing a user input;
determining a user identifier associated with the first audio data;
receiving system usage data associated with the user identifier;
based at least in part on the system usage data, determining a first pre-established feedback prompt associated with a first skill identifier and first criteria;
based at least in part on the system usage data, determining a second pre-established feedback prompt associated with a second skill identifier and second criteria;
determining, based at least in part on context data associated with the first audio data and the system usage data, second data indicating a user will provide unbiased feedback in response to the first pre-established feedback prompt;
based at least in part on the second data and the first criteria, determining a first likelihood that output of the first pre-established feedback prompt will result in a first user response;
determining the first likelihood satisfies a threshold likelihood; and
based at least in part on the second data and determining the first likelihood satisfies the threshold likelihood, causing the first device to output the first pre-established feedback prompt instead of the second pre-established feedback prompt.

2. The method of claim 1, further comprising:
receiving, from the first device, third data representing a second user input;
determining the second user input corresponds to first user feedback;
based at least in part on determining the second user input corresponds to the first user feedback, determining the first pre-established feedback prompt is associated with the first skill identifier; and
sending, to a first skill component associated with the first skill identifier, the third data.

3. The method of claim 2, further comprising:
determining the first skill identifier is associated with a grouping of functionality;
determining a third skill identifier associated with the grouping of functionality, the third skill identifier being unassociated with the first pre-established feedback prompt; and
sending, to a third skill component associated with the third skill identifier, the third data.

4. The method of claim 1, further comprising:
after causing the first pre-established feedback prompt to be output, receiving text data representing a second user input;
performing natural language understanding (NLU) processing on the text data to generate NLU results data, the NLU results data being weighted to favor a feedback component based at least in part on the text data being received after the first pre-established feedback prompt was output;
determining a first portion, of the NLU results data, corresponding to first user feedback;
determining a second portion, of the NLU results data, corresponding to a command to perform an action;
based at least in part on determining the first portion of the NLU results data, storing an association between the first portion of the NLU results data and the first skill identifier; and
based at least in part on determining the second portion of the NLU results data, causing NLU processing, without favoring the feedback component, to be performed on the text data.

5. The method of claim 1, wherein:
determining the second data comprises at least one of:
determining third data representing whether the first audio data was received when content was being output; or
determining profanity data representing whether the user input included profanity.

6. The method of claim 1, further comprising:
after causing the first pre-established feedback prompt to be output, receiving text data representing a second user input;
performing natural language understanding (NLU) processing on the text data to generate NLU results data, the NLU results data being weighted to favor a feedback component based at least in part on the text data being received after the first pre-established feedback prompt was output;
determining the NLU results data corresponds to a command to perform an action; and
based at least in part on determining the NLU results data corresponds to the command, causing NLU processing, without favoring the feedback component, to be performed on the text data.

7. The method of claim 1, wherein the method further comprises:
performing automatic speech recognition (ASR) processing on the first audio data to generate text data;
performing natural language understanding (NLU) processing on the text data to generate a value representing the user input corresponds to a command to perform an action;
determining the value fails to satisfy a threshold value; and
after determining the value fails to satisfy the threshold value, determining the first likelihood.

8. A system, comprising:
at least one processor; and
at least one memory comprising instructions that, when executed by the at least one processor, cause the system to:
receive, from a first device, first audio data representing a user input;
determine a user identifier associated with the first audio data;
receive system usage data associated with the user identifier;
based at least in part on the system usage data, determine a first pre-established feedback prompt associated with a first skill identifier and first criteria;
based at least in part on the system usage data, determine a second pre-established feedback prompt associated with a second skill identifier and second criteria;
determine, based at least in part on context data associated with the first audio data and the system usage data, second data indicating a user will provide unbiased feedback in response to the first pre-established feedback prompt;
based at least in part on the second data and the first criteria, determine a first likelihood that output of the first pre-established feedback prompt will result in a first user response;
determine the first likelihood satisfies a threshold likelihood; and
based at least in part on the second data and determining the first likelihood satisfies the threshold likelihood, cause the first device to output the first pre-established feedback prompt instead of the second pre-established feedback prompt.

9. The system of claim 8, wherein the at least one memory further comprises instructions that, when executed by the at least one processor, further cause the system to:
receive, from the first device, third data representing a second user input;
determine the second user input corresponds to first user feedback;
based at least in part on determining the second user input corresponds to the first user feedback, determine the first pre-established feedback prompt is associated with the first skill identifier; and
send, to a first skill component associated with the first skill identifier, the third data.

10. The system of claim 9, wherein the at least one memory further comprises instructions that, when executed by the at least one processor, further cause the system to:
determine the first skill identifier is associated with a grouping of functionality;
determine a third skill identifier associated with the grouping of functionality, the third skill identifier being unassociated with the first pre-established feedback prompt; and send, to a third skill component associated with the third skill identifier, the third data.

11. The system of claim 8, wherein the at least one memory further comprises instructions that, when executed by the at least one processor, further cause the system to:
  after causing the first pre-established feedback prompt to be output, receive text data representing a second user input;
  perform natural language understanding (NLU) processing on the text data to generate NLU results data, the NLU results data being weighted to favor a feedback component based at least in part on the text data being received after the first pre-established feedback prompt was output;
  determine a first portion, of the NLU results data, corresponding to first user feedback;
  determine a second portion, of the NLU results data, corresponding to a command to perform an action;
  based at least in part on determining the first portion of the NLU results data, store an association between the first portion of the NLU results data and the first skill identifier; and
  based at least in part on determining the second portion of the NLU results data, cause NLU processing, without favoring the feedback component, to be performed on the text data.

12. The system of claim 8, wherein the at least one memory further comprises instructions that, when executed by the at least one processor, further cause the system to:
  determine the second data by determining at least one of:
    third data representing whether the first audio data was received when content was being output; or
    profanity data representing whether the user input included profanity.

13. The system of claim 8, wherein the at least one memory further comprises instructions that, when executed by the at least one processor, further cause the system to:
  after causing the first pre-established feedback prompt to be output, receive text data representing a second user input;
  perform natural language understanding (NLU) processing on the text data to generate NLU results data, the NLU results data being weighted to favor a feedback component based at least in part on the text data being received after the first pre-established feedback prompt was output;
  determine the NLU results data corresponds to a command to perform an action; and
  based at least in part on determining the NLU results data corresponds to the command, cause NLU processing, without favoring the feedback component, to be performed on the text data.

14. The system of claim 8, wherein the at least one memory further comprises instructions that, when executed by the at least one processor, further cause the system to:
  perform automatic speech recognition (ASR) processing on the first audio data to generate text data;
  perform natural language understanding (NLU) processing on the text data to generate a value representing the user input corresponds to a command to perform an action;
  determine the value fails to satisfy a threshold value; and
  after determining the value fails to satisfy the threshold value, determine the first likelihood.

15. A method, comprising:
  receiving, from a first device, first audio data representing a user input;
  determining a first pre-established feedback prompt associated with a first skill identifier and first criteria;
  determining, based at least in part on context data, second data indicating a user will provide unbiased feedback;
  based at least in part on the second data and the first criteria, determining a first likelihood that output of the first pre-established feedback prompt will result in a first user response;
  determining the first likelihood satisfies a threshold likelihood;
  based at least in part on determining the first likelihood satisfies the threshold likelihood, causing the first device to output the first pre-established feedback prompt;
  after causing the first pre-established feedback prompt to be output, receiving text data representing a second user input;
  performing natural language understanding (NLU) processing on the text data to generate NLU results data, the NLU results data being weighted to favor a feedback component based at least in part on the text data being received after the first pre-established feedback prompt was output;
  determining the NLU results data corresponds to a command to perform an action; and
  based at least in part on determining the NLU results data corresponds to the command, causing NLU processing, without favoring the feedback component, to be performed on the text data.

* * * * *